United States Patent
Veltrop et al.

(10) Patent No.: US 9,714,110 B2
(45) Date of Patent: Jul. 25, 2017

(54) HOLDING TANK WITH INTERNALLY REINFORCED SIDEWALLS AND LIQUID DISPENSER USING SAME

(71) Applicant: Prince Castle LLC, Carol Stream, IL (US)

(72) Inventors: Loren Veltrop, Chicago, IL (US); Christopher Lyons, LaGrange Park, IL (US); Michael A. Graef, Naperville, IL (US)

(73) Assignee: Prince Castle LLC, Carol Stream, IL (US)

( * ) Notice: Subject to any disclaimer, the term of this patent is extended or adjusted under 35 U.S.C. 154(b) by 0 days.

(21) Appl. No.: 15/144,211

(22) Filed: May 2, 2016

(65) Prior Publication Data

US 2016/0244199 A1    Aug. 25, 2016

Related U.S. Application Data

(63) Continuation of application No. 13/428,328, filed on Mar. 23, 2012, now abandoned.

(51) Int. Cl.
| | |
|---|---|
| B65D 1/46 | (2006.01) |
| F25D 23/00 | (2006.01) |
| F25D 23/12 | (2006.01) |
| B65D 25/24 | (2006.01) |
| B67D 7/78 | (2010.01) |
| F16K 7/06 | (2006.01) |

(52) U.S. Cl.
CPC .............. *B65D 1/46* (2013.01); *B65D 25/24* (2013.01); *B67D 7/78* (2013.01); *F16K 7/068* (2013.01); *F25D 23/00* (2013.01); *F25D 23/126* (2013.01); *F25D 2323/122* (2013.01)

(58) Field of Classification Search
CPC ........... B65D 1/46; B65D 25/24; F16K 7/068; B67D 7/78; F25D 23/126; F25D 23/00; F25D 2323/122
USPC ................................ 222/143, 185.1; 220/653
See application file for complete search history.

(56) References Cited

U.S. PATENT DOCUMENTS

| 673,954 A | * | 5/1901 | Hoberecht ................... 220/653 |
| 2,545,118 A | | 3/1951 | St. Clair |
| 2,560,761 A | | 7/1951 | Ferguson |
| 2,718,985 A | | 9/1955 | Tamminga |

(Continued)

FOREIGN PATENT DOCUMENTS

| AU | 9888438 B2 | 10/1998 |
| CN | 101446833 | 6/2009 |

(Continued)

OTHER PUBLICATIONS

Automatic Products International, Ltd, Hot Beverage Merchandiser Manual, 1994.

(Continued)

*Primary Examiner* — Donnell Long
(74) *Attorney, Agent, or Firm* — Andrus Intellectual Property Law, LLP

(57) ABSTRACT

The inward and outward deflection of sidewalls of a holding tank for liquids is reduced or eliminated by sidewall reinforcing stringers that extend between the sides and which are located inside the tank. The stringers, maintain the separation distance between the sidewalls to keep the sidewalls substantially parallel to each other.

20 Claims, 20 Drawing Sheets

(56) References Cited

U.S. PATENT DOCUMENTS

| | | | |
|---|---|---|---|
| 2,831,610 A | 4/1958 | Dennie | |
| 3,011,640 A | 12/1961 | Hoiness | |
| 3,117,695 A | 1/1964 | Cox, Jr. | |
| 3,178,064 A | 4/1965 | Layne | |
| 3,368,708 A | 2/1968 | Pflederer | |
| 3,539,081 A | 11/1970 | Norton et al. | |
| 3,640,430 A | 2/1972 | Roberts | |
| 4,143,795 A | 3/1979 | Casebier | |
| 4,228,758 A * | 10/1980 | Dornau | B63B 59/02 114/219 |
| 4,244,218 A | 1/1981 | Wohrl | |
| 4,467,844 A | 8/1984 | Di Gianfilippo et al. | |
| 4,481,985 A | 11/1984 | Bruder et al. | |
| 4,523,698 A | 6/1985 | Kienlein et al. | |
| 4,586,546 A | 5/1986 | Mezei et al. | |
| 4,630,654 A | 12/1986 | Kennedy, Jr. | |
| 4,757,920 A | 7/1988 | Harootian, Jr. et al. | |
| 4,759,478 A | 7/1988 | Richardson et al. | |
| 4,765,360 A | 8/1988 | Baird | |
| 4,784,297 A | 11/1988 | Katz | |
| 4,804,118 A | 2/1989 | Mullen et al. | |
| 4,821,921 A | 4/1989 | Cartwright et al. | |
| 4,825,758 A | 5/1989 | Snowball et al. | |
| 4,856,563 A | 8/1989 | Yamaguchi et al. | |
| 4,889,255 A | 12/1989 | Schiemann | |
| 4,917,265 A | 4/1990 | Chiang | |
| 4,979,641 A | 12/1990 | Turner | |
| 4,997,012 A | 3/1991 | Kuziw | |
| 4,998,647 A | 3/1991 | Sharp | |
| 5,086,816 A | 2/1992 | Mieth | |
| 5,105,981 A | 4/1992 | Gehman | |
| RE33,943 E | 6/1992 | Arzberger et al. | |
| 5,148,841 A | 9/1992 | Graffin | |
| 5,228,594 A | 7/1993 | Aslin | |
| 5,249,706 A | 10/1993 | Szabo | |
| 5,287,896 A | 2/1994 | Graffin | |
| 5,294,022 A | 3/1994 | Earle | |
| 5,303,585 A | 4/1994 | Lichte | |
| 5,316,159 A | 5/1994 | Douglas et al. | |
| 5,340,211 A | 8/1994 | Pratt | |
| 5,353,957 A | 10/1994 | Campau | |
| 5,377,868 A | 1/1995 | Hernandez et al. | |
| 5,490,614 A | 2/1996 | Sardynski | |
| 5,492,250 A | 2/1996 | Sardynski | |
| 5,535,600 A | 7/1996 | Mills | |
| 5,544,518 A | 8/1996 | Hart et al. | |
| 5,556,002 A | 9/1996 | Green | |
| 5,566,732 A | 10/1996 | Nelson | |
| 5,570,731 A | 11/1996 | Muscara | |
| 5,586,085 A | 12/1996 | Lichte | |
| 5,588,558 A | 12/1996 | Cox et al. | |
| 5,607,072 A | 3/1997 | Rigney et al. | |
| 5,673,817 A | 10/1997 | Mullen et al. | |
| 5,713,486 A | 2/1998 | Beech | |
| 5,740,947 A | 4/1998 | Flaig et al. | |
| 5,797,519 A | 8/1998 | Schroeder et al. | |
| 5,816,445 A | 10/1998 | Gardos et al. | |
| 5,850,757 A | 12/1998 | Wierenga | |
| D404,302 S | 1/1999 | Martin | |
| 5,905,656 A | 5/1999 | Wang et al. | |
| 5,921,440 A | 7/1999 | Maines | |
| 5,987,971 A | 11/1999 | Sahm et al. | |
| 6,095,372 A | 8/2000 | Dorsey et al. | |
| 6,131,772 A | 10/2000 | Robbins et al. | |
| 6,186,361 B1 | 2/2001 | Teetsel, III | |
| 6,253,957 B1 | 7/2001 | Messerly et al. | |
| 6,325,229 B1 | 12/2001 | Anders | |
| 6,328,881 B1 | 12/2001 | Larkner et al. | |
| 6,401,045 B1 | 6/2002 | Rogers et al. | |
| 6,497,343 B1 | 12/2002 | Teetsel, III | |
| 6,659,311 B2 | 12/2003 | Prueter | |
| 6,792,966 B2 | 9/2004 | Harvey | |
| 6,866,241 B1 | 3/2005 | Libretto | |
| 6,951,276 B2 | 10/2005 | Danner et al. | |
| 7,021,206 B2 | 4/2006 | Eckenhausen et al. | |
| D558,604 S | 1/2008 | Dohm et al. | |
| 7,337,920 B2 | 3/2008 | Duck et al. | |
| 7,350,761 B1 | 4/2008 | Stuart | |
| RE40,310 E | 5/2008 | Larkner et al. | |
| 7,606,678 B2 | 10/2009 | Evans | |
| 7,628,342 B2 | 12/2009 | Shimoda et al. | |
| 7,677,412 B2 | 3/2010 | Litterst et al. | |
| 7,712,631 B2 | 5/2010 | Taradalsky et al. | |
| 7,750,817 B2 | 7/2010 | Teller | |
| 7,926,682 B2 | 4/2011 | Nelson et al. | |
| 8,176,948 B2 | 5/2012 | Carrig | |
| 8,181,822 B2 | 5/2012 | Doelman et al. | |
| 8,277,745 B2 | 10/2012 | Mehus et al. | |
| 8,322,571 B2 | 12/2012 | Hovinen et al. | |
| 8,376,310 B2 | 2/2013 | Veltrop et al. | |
| 8,534,497 B2 | 9/2013 | Veltrop et al. | |
| 2001/0032863 A1 | 10/2001 | Feygin | |
| 2003/0003208 A1 | 1/2003 | Lassota | |
| 2003/0006247 A1 | 1/2003 | Olivier et al. | |
| 2004/0134920 A1 | 7/2004 | Baron | |
| 2004/0187570 A1 | 9/2004 | Williamson | |
| 2004/0226452 A1 | 11/2004 | Lyall, III | |
| 2004/0226959 A1 | 11/2004 | Mehus et al. | |
| 2005/0231553 A1 | 10/2005 | Horsnell et al. | |
| 2006/0110512 A1 | 5/2006 | Blomme et al. | |
| 2006/0113312 A2 | 6/2006 | Shin et al. | |
| 2006/0134598 A1 | 6/2006 | Kenney | |
| 2006/0169720 A1 | 8/2006 | Vipond | |
| 2006/0238346 A1 | 10/2006 | Teller | |
| 2007/0074709 A1 | 4/2007 | Kato et al. | |
| 2007/0108225 A1 | 5/2007 | O'Dougherty | |
| 2007/0192981 A1 | 8/2007 | Lawshe | |
| 2007/0237446 A1 | 10/2007 | Hirao et al. | |
| 2007/0246488 A1 | 10/2007 | Cash et al. | |
| 2007/0267378 A1 | 11/2007 | Piccinino et al. | |
| 2007/0267446 A1 | 11/2007 | Pressler | |
| 2008/0071424 A1 | 3/2008 | St. Jean et al. | |
| 2008/0092642 A1 | 4/2008 | Grimm et al. | |
| 2008/0271928 A1 | 11/2008 | Mehus et al. | |
| 2008/0283550 A1 | 11/2008 | Nighy et al. | |
| 2009/0007938 A1 | 1/2009 | Dubreuil et al. | |
| 2009/0250490 A1 | 10/2009 | Straza | |
| 2009/0250491 A1 | 10/2009 | Erman et al. | |
| 2009/0306633 A1 | 12/2009 | Trovato et al. | |
| 2010/0065587 A1 | 3/2010 | Erman et al. | |
| 2010/0155415 A1 | 6/2010 | Ashrafzadeh et al. | |
| 2011/0073525 A1 | 3/2011 | Evans | |
| 2011/0165034 A1 | 7/2011 | Carlson et al. | |
| 2012/0018654 A1 | 1/2012 | Wennberg et al. | |
| 2012/0068093 A1 | 3/2012 | Veltrop et al. | |
| 2014/0144936 A1 | 5/2014 | Mehus et al. | |
| 2014/0263430 A1 | 9/2014 | Keating et al. | |

FOREIGN PATENT DOCUMENTS

| | | |
|---|---|---|
| GB | 2184853 | 12/1986 |
| GB | 2398064 | 2/2003 |
| WO | 9425354 A1 | 11/1994 |
| WO | 9854553 A1 | 12/1998 |
| WO | 02074636 A1 | 9/2002 |
| WO | 2004037595 A1 | 5/2004 |
| WO | 2005030276 A1 | 4/2005 |
| WO | 2008153535 A1 | 12/2008 |
| WO | 2010038047 A2 | 4/2010 |

OTHER PUBLICATIONS

Cengal et al., Fluid Mechanics, Fundamentals and Applications; Chapter 12: Radiation Process and Properties, McGraw Hill, Higher Education, Copyright 2006.

Dally et al., Instrumentation for Engineering Measurements, pp. 242-291; John Wiley & Sons, Inc., 1984.

Fluid Mechanics, Fundamentals and Applications; Yunus A. Cengal and John M. Cibal; Chapter 12: Radiation Process and Properties, McGraw Hill, Higher Education, Copyright 2006.

Fundamentals of Fluid Mechanics, Fifth Edition, pp. 112-113 Bruce R. Munson, Doald F. Young, and Theodore H. Okiishi, Copyright 2006.

(56) References Cited

OTHER PUBLICATIONS

Gerald, Curtis F., Applied Numerical Analysis, 2nd Edition, pp. 465-516, Addison-Wesley Publishing Company, 1978.
Heinz Foodservice, The Heinz Guide to Condiment Dispensing Equipment, 2011.
Munson et al., Fundamentals of Fluid Mechanics, Fifth Edition, pp. 112-113, Copyright 2006.
Pinch Valve Semantics, David Gardellin, President of Onyx Valve Co., available at www.onyxvalve.com, 2011.
Silver King, Cream Dispenser Technical Manual and Replacement Parts List Model SKNES2B/3B, 2011.
Shames, Irving H., Mechanics of Fluids, 4th Edition, pp. 799-802, McGraw-Hill, New York, NY, USA, 2003.
Silver King, Portion Control Cream Dispensers, 2005.
Silver King, Model SKMCD1P, Equipment Manual for McDonald's, 2005.
Silver King, Majestic Series Milk Dispenser, 2009.
SureShot Dispensing Systems, Suggested Preventive Maintenance Checklist for Refrigerated Liquid Dispenser, Sep. 2006.
SureShot, Flexoshot, Manual Dispense Refrigerated Liquid Dispensers with Optional Illuminated Display, Sep. 2007.
SureShot, Intellishot Advanced Portion Controlled Refrigerated Liquid Dispensers, Sep. 2007.
SureShot Dispensing Systems, Dairy Dispenser Valve Assembly Cleaning Instructions, 2011.
SureShot Dispensing Systems, Sure Touch Refrigerated Liquid Dispenser Operations Manual, 2011.
SureShot Dispensing Systems, SugarShot Granular Sugar Dispensers Parts Catalogue, 2011.
SureShot, Intellishot, Advanced Portion Controlled Refrigerated Liquid Dispensers, Jan. 2011.
White, Frank M., Fluid Mechanics, 4th Edition, pp. 3-225, McGraw-Hill, New York, NY, USA, 1999.

\* cited by examiner

HOLDING TANK WITH INTERNALLY REINFORCED SIDEWALLS AND LIQUID DISPENSER USING SAME

CROSS REFERENCE TO RELATED APPLICATION

This application is continuation of U.S. application Ser. No. 13/428,328, filed Mar. 23, 2012, which application was published on Sep. 26, 2013, as U.S. Publication No. U.S. US2013/0248538, which application is incorporated herein by reference.

BACKGROUND

This application relates to liquid holding tanks having one or more relatively thin, planar side walls. More particularly, this invention relates to liquid holding tanks made of thin and flexible materials, the shapes of such tanks being reminiscent of rectangular parallelepipeds.

As used herein, a parallelepiped is considered to be a volume or body bounded by four rectangles and two parallelograms. A rectangular parallelepiped, however, is a parallelepiped, all six faces of which are rectangles or substantially rectangular. A rectangular parallelepiped is also considered to be a right prism, the bases of which (top and bottom surfaces) are parallelograms. A cube is a rectangular parallelepiped because it is a volume or body bounded by six identical squares, the squares being rectangles.

A problem with holding tanks having thin, flat side walls is that such walls tend to bow outwardly when the tank contains liquid because of the distributed force exerted on the walls by the liquid. As the level of the liquid in the tanks rises, the outward deflection of the walls increases. Outward deflection of sidewalls used in a rectangular, parallelepiped-shaped tank can make it difficult to remove the tank from a space wherein the nominal tank width is such that it just fits into the space.

The inward deflection of a tank's sidewalls can also be problematic. In many liquid holding tanks, the level of the upper surface of the liquid held in the tank is used to determine the volume held in the tank. The height of the upper level also determines the pressure at the bottom of the tank. Since most liquid dispensers draw liquid from the bottom of the tank, the height of the upper level will determine not only the flow rate from the tank but also the apparent volume left in a tank. A liquid holding tank with thin walls that are able to be held upright would be an improvement over the prior art.

DETAILED DESCRIPTION

Figure 1:
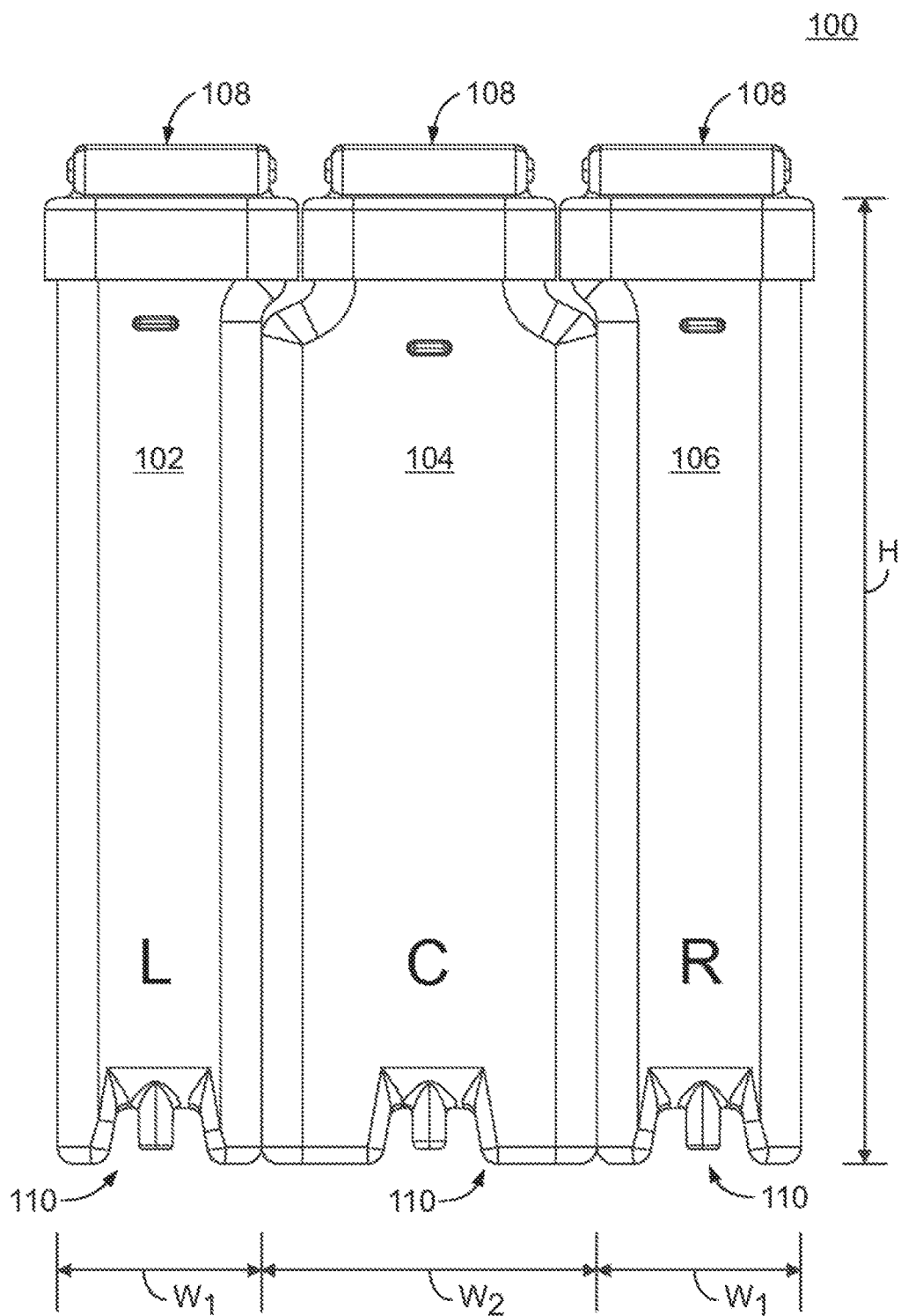
FIG. 1 is a front view of three liquid holding tanks.

FIG. 1 is a front view of an assembly of liquid holding tanks 100. The assembly 100 is comprised of a left-hand tank 102, a center tank 104, and a right-hand tank 106. Each tank has a top 108 and a bottom 110.

The left tank 102 and the right tank 106 both have a nominal width $W.sub.1$, which is less than the nominal width $W.sub.2$ of the center tank 104. All three tanks have the same nominal height, H. All three tanks are the same nominal depth, which is considered to extend into the plane of the page on which FIG. 1 is drawn.

The tanks' various dimensions and their resultant sizes are design choices. The tanks' sizes shown in FIG. 1 are for illustration purposes only.

All three tanks are considered to have "thin" sidewalls. The side exterior surfaces are also smooth.

The term "thin" should be considered to mean between about 0.4 millimeters (0.015 inches) and about 4 millimeters (0.157 inches). The term "smooth" is considered herein to mean that the exterior sidewall surfaces are without a projection, which if between two tanks would prevent the two adjacent sides from making contact with each other.

Although the sidewalls are thin and thus susceptible to outward deflection or bowing when the tanks hold liquid and susceptible to inward deflection or bowing because of manufacturing defects or an object pressing inwardly, the side walls of the tanks are reinforced to reduce or eliminate outward deflection when the tanks hold liquid, and reduce or eliminate inward deflection or deformation. The tanks shown in FIG. 1 are considered to be "sandwiched" against each other because the sides of the tanks are in contact with each other. They are nevertheless able to freely slide against each other, including freely moving vertically relative to each other. The left side outside sidewall of the left tank 102 and the right side outside sidewall of the right tank 106 contacts adjacent surfaces of a refrigerated cabinet, not shown in FIG. 1.

The physical contact between the smooth surfaces of the tanks' sidewalls provides an enhanced heat transfer path between the tanks, liquids contained inside them and the sidewalls of a heated or cooled cabinet, when the tanks and a cabinet for them are sized, shaped and arranged to provide an intimate contact between them, as shown in the Applicant's co-pending patent applications. One such application is application Ser. No. 12/885,659 filed on Sep. 20, 2010, and which is entitled, "Dispenser for Liquids," the entire contents of which are incorporated by reference. Another application is application Ser. No. 13/169,339, filed Jun. 27, 2011 and which is entitled "Liquid Dispenser with Storage Tanks" The entire contents of that patent application (application Ser. No. 13/169,339) are also incorporated herein by reference.

The tank assembly 100 is configured for use in a liquid dispenser, by which is meant that the tanks are sized, shaped and arranged to be used in a liquid dispenser. Examples of such dispensers can be found in the aforementioned patent applications incorporated herein by reference. The sidewalls are preferably thin in order to reduce the tanks' cost but to also reduce their weight while maximizing the volume of liquid they can hold in a relatively small refrigerated cabinet.

Figure 11:
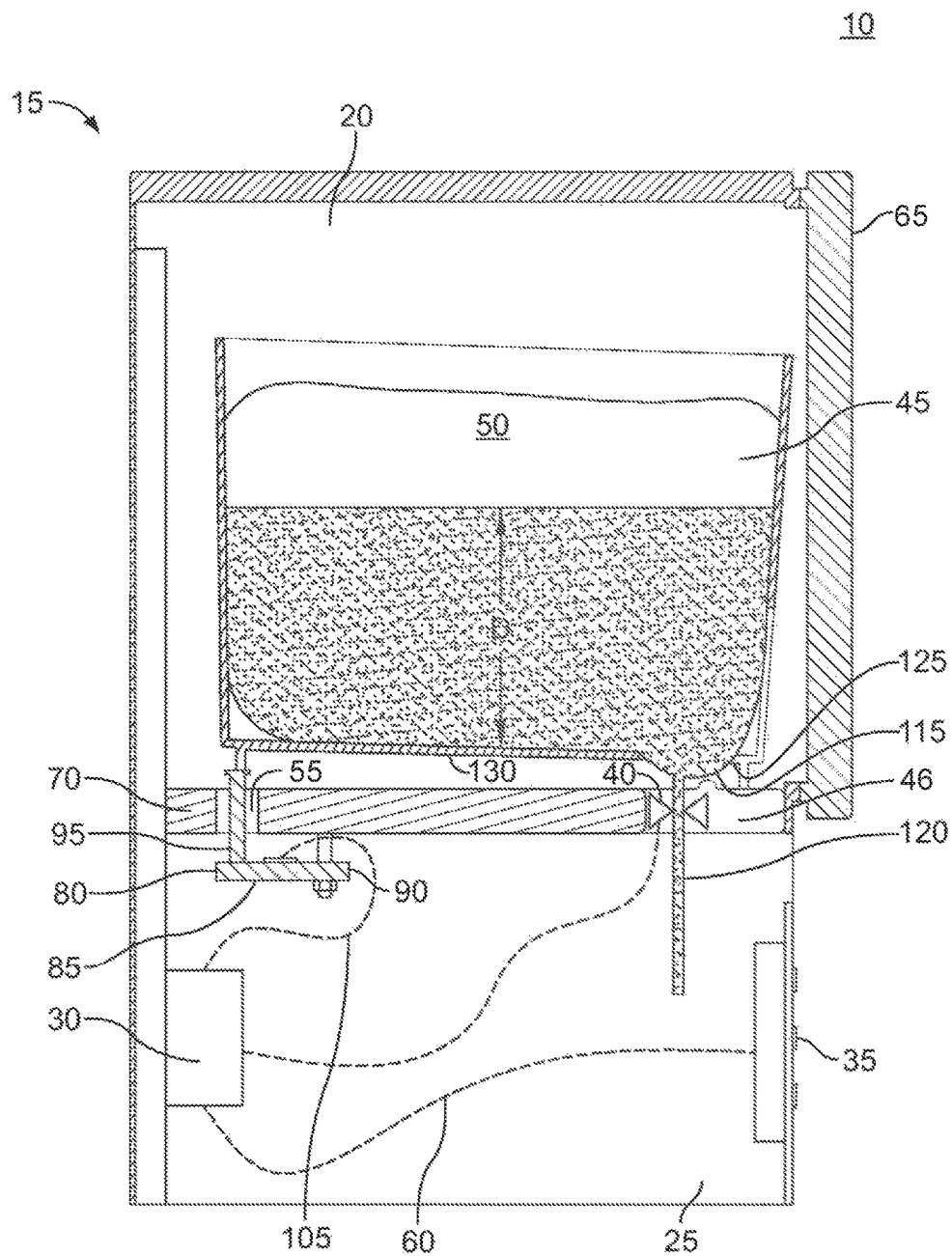
FIG. 11 is a cross sectional view of a dispenser.

FIG. 11 depicts a liquid dispenser apparatus 10 for dispensing specific volumes of liquids. The liquids that can be dispensed have viscosities that vary from about 1 centipoise to about 7500 centipoise. The dispensable liquids thus include low viscosity alcohols, water, juices, moderate viscosity liquids like dairy products such as milk and cream, and viscous liquids that include oils including petroleum products and syrups. The dispensable volumes range from fractions of a liquid ounce up to volumes measured in gallons. An important feature of the apparatus is that unlike prior art dispensers, the apparatus 10 permits an operator to manually dispense any volume of liquid and immediately thereafter, resume accurately dispensing user-requested fixed volumes without losing accuracy of the dispensed volumes.

The apparatus 10 is comprised of a cabinet 15 having a refrigerated upper compartment 20 and an unrefrigerated lower compartment 25. The lower compartment 25 encloses refrigeration equipment used to keep the upper compartment cold. Refrigeration equipment is well known and omitted from the figures for clarity.

The lower compartment 25 encloses a control computer 30. The computer 30 is preferably embodied as a single-chip microcontroller with on-board memory. Such microcontrollers are well known to those of ordinary skill in the art. Many of them have electrical interfaces on the microcontroller which send and receive electrical signals to and from other circuitry and devices, not shown but which interface, i.e., electrically connect, the computer 30 to peripheral devices that include an array of push-button, operator-actuated dispensing control switches 35, a dispensing control valve 40. In alternate embodiments described below, the computer 30 is coupled to various devices described below, which are used to determine the level of the liquid 45 in the tank 50.

The dispensing valve 40 is a pinch valve. The pinch valve 40 pinches off, i.e., closes, a flexible dispensing tube that extends from the tank 50. The valve is explained more fully below and in the Applicant's U.S. Pat. No. 8,376,310 entitled Pinch Valve, the contents of which are incorporated herein by reference in their entirety.

In the preferred embodiment, a user can select a particular volume of liquid to dispense by actuating one or more push button switches 35 affixed to the front panel 55 of the lower compartment 25. Wires 60 connect the switches 35 to the computer 30 located in the lower compartment 25. Switch closures are detected by the computer 30. Each switch requests the computer to dispense a different volume. The particular volume selected by the various switches is a design choice. In one embodiment, the software in the computer memory is written to interpret multiple switch closures, whether they are made serially or in parallel, as requests for multiple volumes. By way of example, actuation of a 1-ounce switch informs the computer 30 that one ounce is requested by a user. Actuation of a 1-ounce switch followed immediately by actuation of a 3-ounce switch, or simultaneously with the 3-ounce switch, is construed by the computer as a user-request for the delivery of four ounces.

Switch closures and electrical signals input to the computer 30 from one or more detectors/sensors described below enable the computer 30 to calculate a time required to open the dispensing valve 40 to dispense a requested volume. The valve open time is determined using a requested volume and a real-time, direct measurement of the liquid in a tank 50. Except for manually-dispensed volumes, which require an operator to manually open the pinch valve, the valve open time for each requested amount of liquid to be dispensed under software control is considered herein to be determined empirically. An empirical determination is considered to be a determination that is made using sensing of the actual amount of liquid in the tank, or the actual level of the liquid in the tank, just before the liquid is actually dispensed. Unlike prior art devices, the valve open time is not determined by counting or accumulating volumes that have been previously dispensed. The valve open time required to dispense a particular volume of liquid is determined empirically prior to each opening of the pinch valve.

Figure 12:
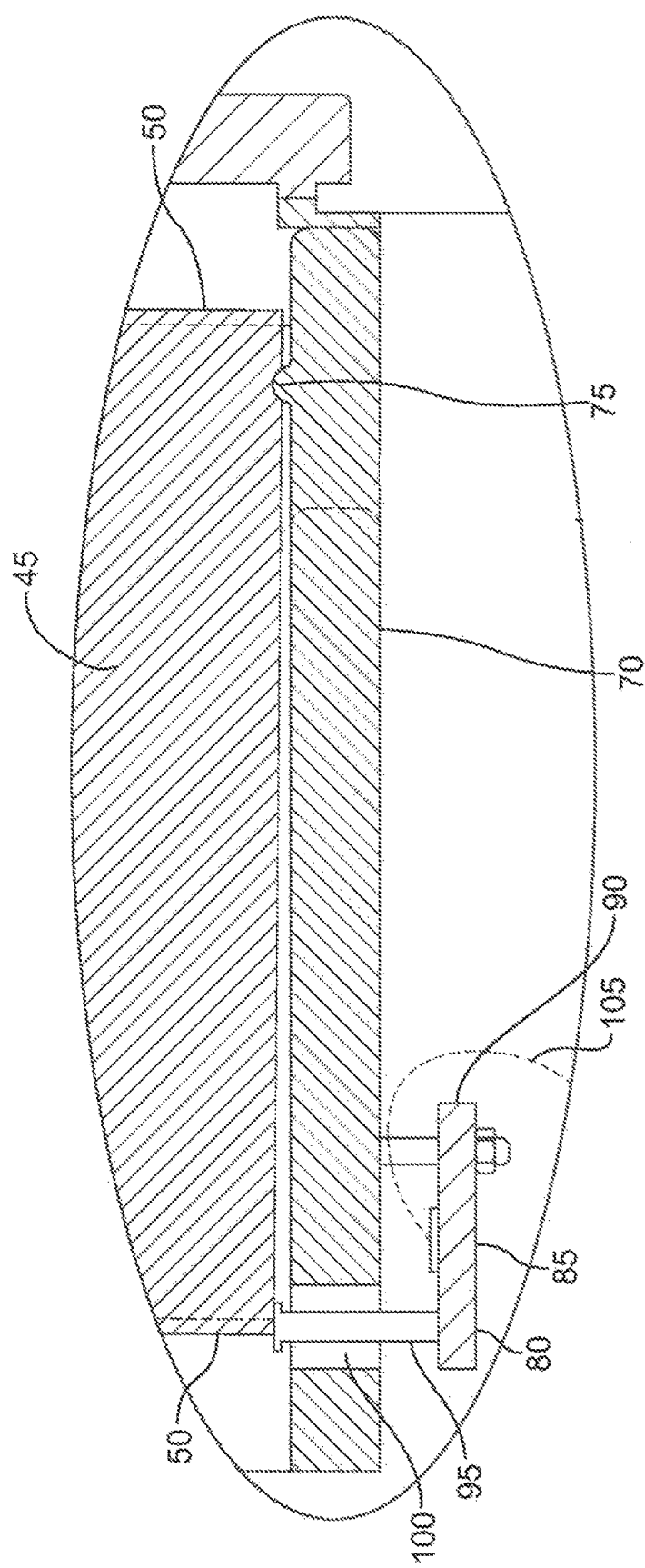
FIG. 12 is an isolated view of a load cell supporting part of a tank in a dispenser.

FIG. 12 is an isolated view of the apparatus 10 showing in cross section, details of a shelf 70 that defines the upper 20 and lower 25 compartments. FIG. 12 shows how the front end of the tank 50 pivots on a fulcrum or ridge 75 that extends into and out of the plane of the figure and which rises upwardly from the top surface of the shelf 70. FIG. 12 also shows how the back end of the tank 50 is supported on one end 80 of a load cell 85 that is cantilevered from an opposite end 90 by a bolt driven into the underside of the shelf 70.

The front end of the tank 50 rests on the fulcrum 75 formed into the top surface of the shelf 70. The tank 50 is thus able to pivot over the fulcrum 75.

The back or rear end of the tank 50 rests on an elongated, upright post 95 that extends downwardly from the underside of the tank 50, through a hole 55 formed in the shelf 70, onto the cantilevered end 80 of the load cell 85. Since the fulcrum 75 supports part of the tank's weight, only a portion of the tank's weight is supported by the fulcrum 75. The rest of the tank's weight is supported by the second end 80 of the load cell 85.

The portion of the tank's weight that is impressed on the load cell 85 causes the load cell 85 to deflect. Load cell deflection changes the electrical resistance of a Wheatstone bridge circuit that is attached to the load cell 85. Since the load cell 85 deflection is proportional to the weight impressed on the load cell by the tank 50 and its contents, the signal "output" from the load cell 85, and which is sent to the computer 30 via the connection wires 105, represents at least a fractional amount of liquid in the tank 50.

In an alternate embodiment, the entire weight of the tank and its contents is supported by one load cell. In one such alternate embodiment, a load cell is located above the center of mass for the tank and its contents. A hook is attached to load end of the load cell. A liquid tank is suspended from the load cell. The entire weight of the tank and its contents is thus measured. Other embodiments use two or more load cells, with each load cell supporting a fractional portion of the tank. One embodiment uses four load cells at each corner of the tank 50 or at each corner of the cabinet 15. In multiple-load cell embodiments, the outputs of the various load cells are summed by the computer 30 and provide a fairly accurate measurement of the entire weight of the tank and/or cabinet 15.

A hinged door 65 provides access to the interior of the upper compartment 20 and to the lower compartment 25. In one embodiment depicted in FIG. 3, the tank 50 is a rigid bin or basin, which holds a flexible bag 115, and which contains the liquid 45 to be dispensed. The bag 115 is formed with an integral liquid dispensing tube 120. The dispensing tube 120 extends from the bag 115 through a hole 125 in the bottom 130 of the tank 50, through a passage 46 formed into the shelf and through the pinch valve 40. Wires connect the pinch valve 40 to the computer 30. Plastic bags containing liquid to be dispensed can be placed into the tank and removed from the tank via the door 65.

To dispense a fixed volume of liquid, a signal from the computer 30 instructs a solenoid controlling the valve 40 to open, i.e., "unpinch," the tube 120 by actuating the pinch valve to an open position. Opening the pinch valve allows liquid to run out of the tank through the tube. The tube 120 is kept unpinched by the computer 30 for a time period that is only long enough to dispense the volume of liquid that was requested by a user at the push button switches 35. When the time required to keep the valve open has elapsed, the pinch valve is closed. In a preferred embodiment, the pinch valve is biased by a spring to be normally closed. The signal from the computer 30 to the valve solenoid thus holds the valve 40 open against the spring. Closing the valve simply requires the valve open signal from the computer to be shut off.

The time that the valve must be held open to dispense a particular volume of liquid requested by operation of one or more switches essentially depends on the pressure of the liquid at the valve 40, just before the valve is opened. The pressure of the liquid 45 on the valve 40 depends on the depth of the liquid 45 above the valve 40. In the figures, the depth of the liquid 40 above the bottom 130 of the tank storing the liquid to be dispensed is denoted by the letter D. A relatively short but nevertheless additional column of liquid exists in the tube that is between the bottom of the tank and the pinch valve 40.

In the preferred embodiment, the depth D of the liquid in the tank 50 is determined from a weight measured by the load cell 85. As is well known, a load cell is essentially a strain gauge in combination with a resistive circuit well known to those of ordinary skill in the electrical arts as a Wheatstone bridge circuit. When the load cell deforms in response to an applied force, the electrical characteristics of the Wheatstone bridge circuit change. The electrical characteristics of the Wheatstone bridge can thus be correlated to a weight supported by the load cell 85. If the density of the liquid is known, and if the geometry of the tank is known, the depth of the liquid in a tank can be derived from the weight of the tank and contents, or from just the weight of the liquid in the tank.

In the preferred embodiment, the time that the valve must be kept open to dispense a user-requested volume of liquid is determined by evaluating a polynomial that effectively correlates a signal obtained from the load cell 85 to the time required to open the valve 40 to dispense a requested volume. See FIG. 19. In the preferred embodiment, the polynomial was experimentally determined to be of the form:

$$y = Ax^3 + Bx^2 + Cx + K$$

where A, B and C are coefficients and K is a constant;
x is the load cell output signal and
y is the valve open time, in seconds.

In tests of a prototype liquid dispenser having one end of the tank 50 supported on a fulcrum 75 and the opposite end supported by a load cell 85 essentially as shown in FIG. 11 and using a pinch valve as described in the aforementioned patent, the coefficients required to dispense one ounce of liquid from the tank were determined to be: A=−0.0012, B=0.0207, C=−0.1444 and K=0.89.

Figure 13:
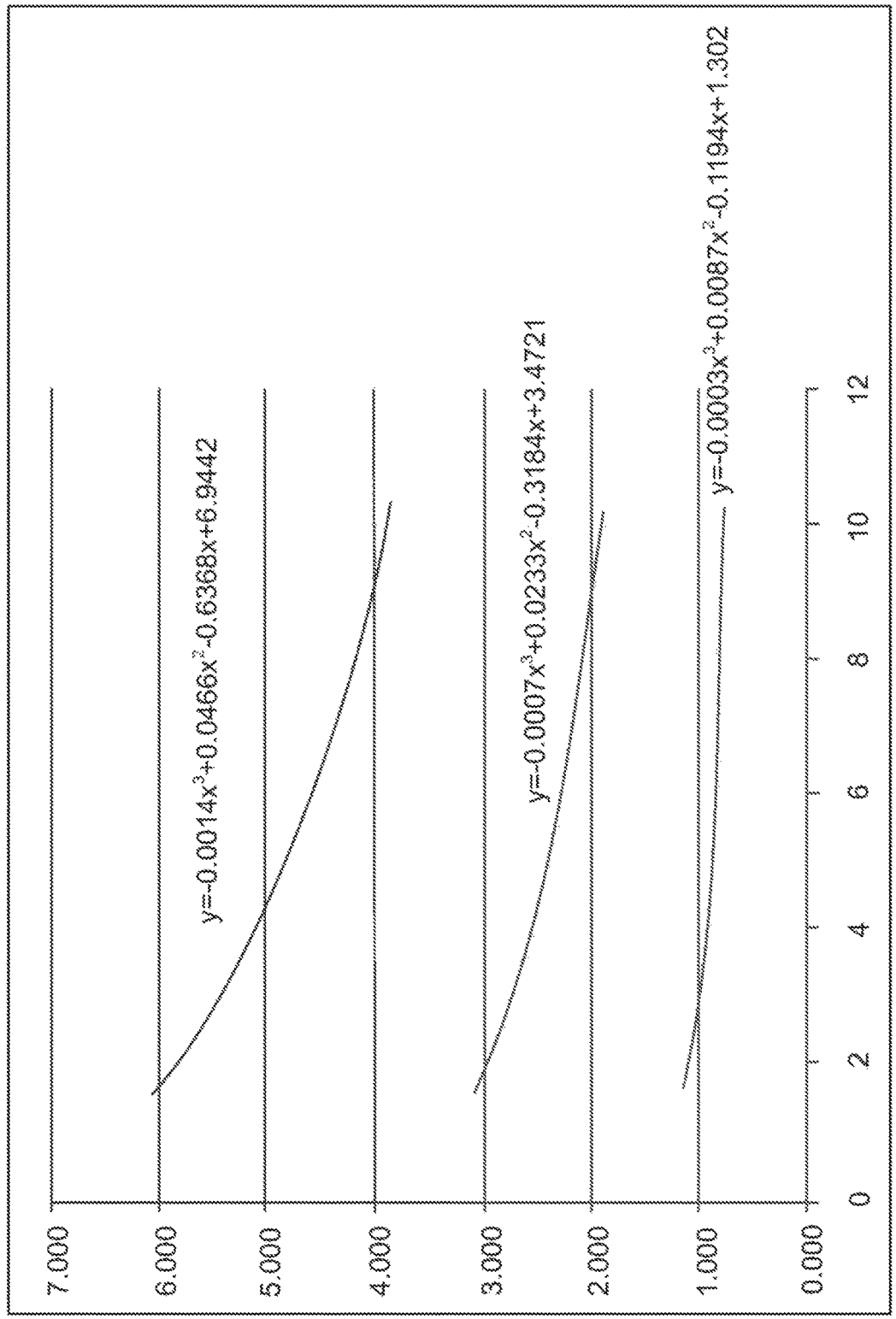
FIG. 13 is a graph depicting plots of different polynomial functions that model experimentally-determined valve open times as a function of liquid level and a user-requested volume, for a dispenser.

FIG. 13 depicts plots of a third-order polynomial for three different requested volumes from the prototype described above. Values along the x axis are different outputs from the load cell, typically a D.C. voltage. The y-axis is the time in seconds required for the valve to be kept open in order to dispense a volume of liquid represented by each curve.

Each curve in FIG. 13 is the plot of a polynomial for a different requested volume. The lowest curve is a plot of the polynomial that determines the valve open time for a first volume of liquid. The middle curve is a plot of the polynomial that determines the valve open time required to dispense a second volume of liquid, greater than the first volume. The top curve is a plot of the polynomial that determines the valve open time required to dispense a third volume of liquid, greater than the second volume. The three polynomials have different coefficients.

The polynomial that models the required valve open time was determined experimentally by measuring volumes of liquid dispensed through a pinch valve when the pinch valve was kept open for a given length of time, with different measured weights of liquid in the tank, i.e., with differing liquid heights. The polynomial thus works to determine valve open times required to dispense a volume of liquid from a particular type of tank and having a particular size, a particular discharge tube, having particular characteristics, e.g., length and inside diameter. The polynomial, which is determined experimentally, correlates a measured weight of the tank and liquid to a required valve open time, regardless of the tank's shape. Using a different tank and/or discharge tube requires different polynomials and/or constant to be determined, preferably by curve fitting, as was done in the preferred embodiment.

In another alternate embodiment, which avoids computing a polynomial, the computer 30 reads or is otherwise provided with a load cell output voltage. The output voltage is used as a pointer into a table, typically stored in RAM, EEPROM, ROM or other computer memory device, from which the computer 30 can read an amount of time required to hold the valve open. If the load cell outputs a voltage that is not in the table, e.g., 7.02 volts, software in the computer 30 rounds the value up or down, as a design choice, to the closest value in the table.

Figure 14:
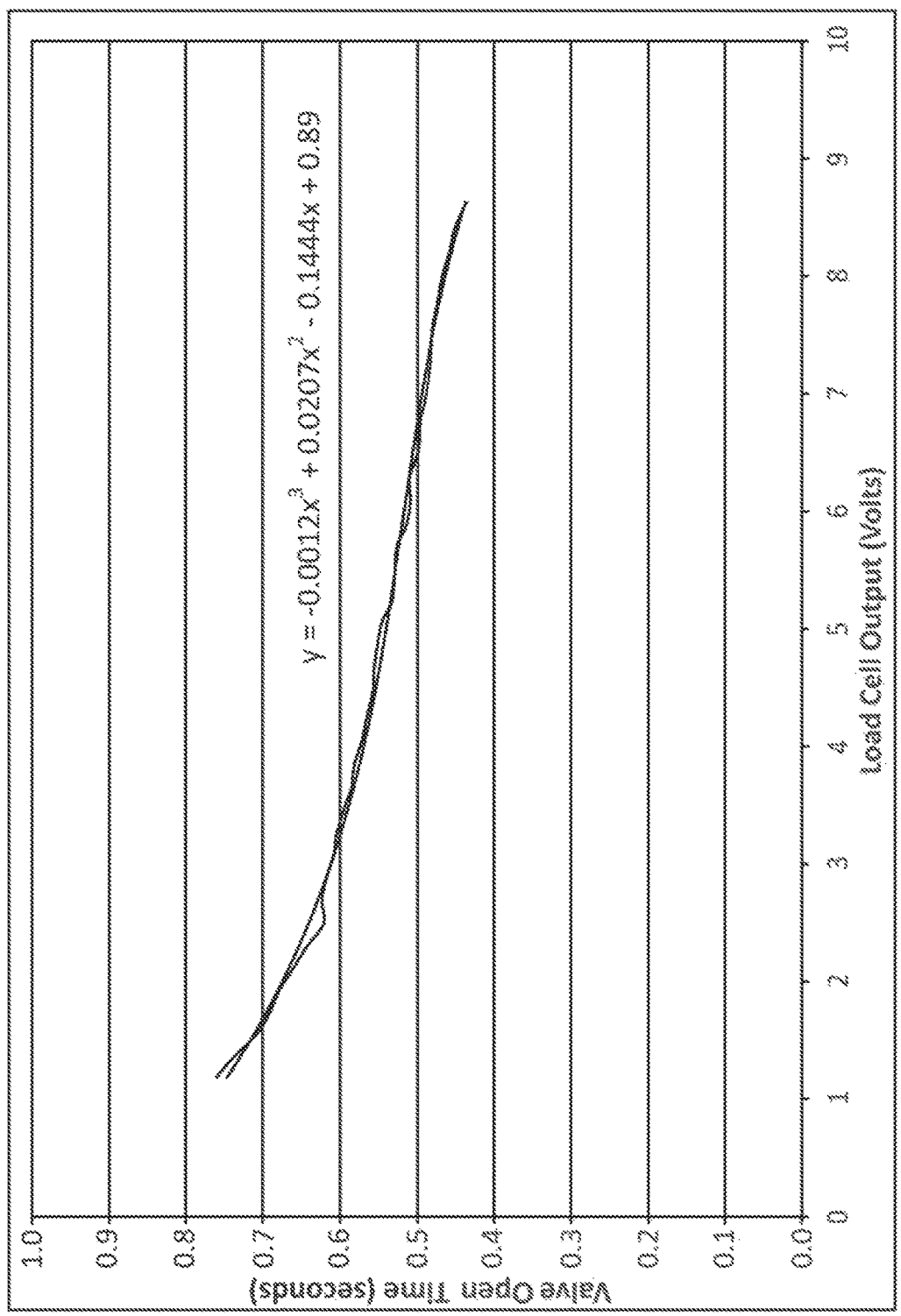
FIG. 14 is a plot of a third-order polynomial representing valve open time in seconds as a function of load cell output in volts.
Figure 15:
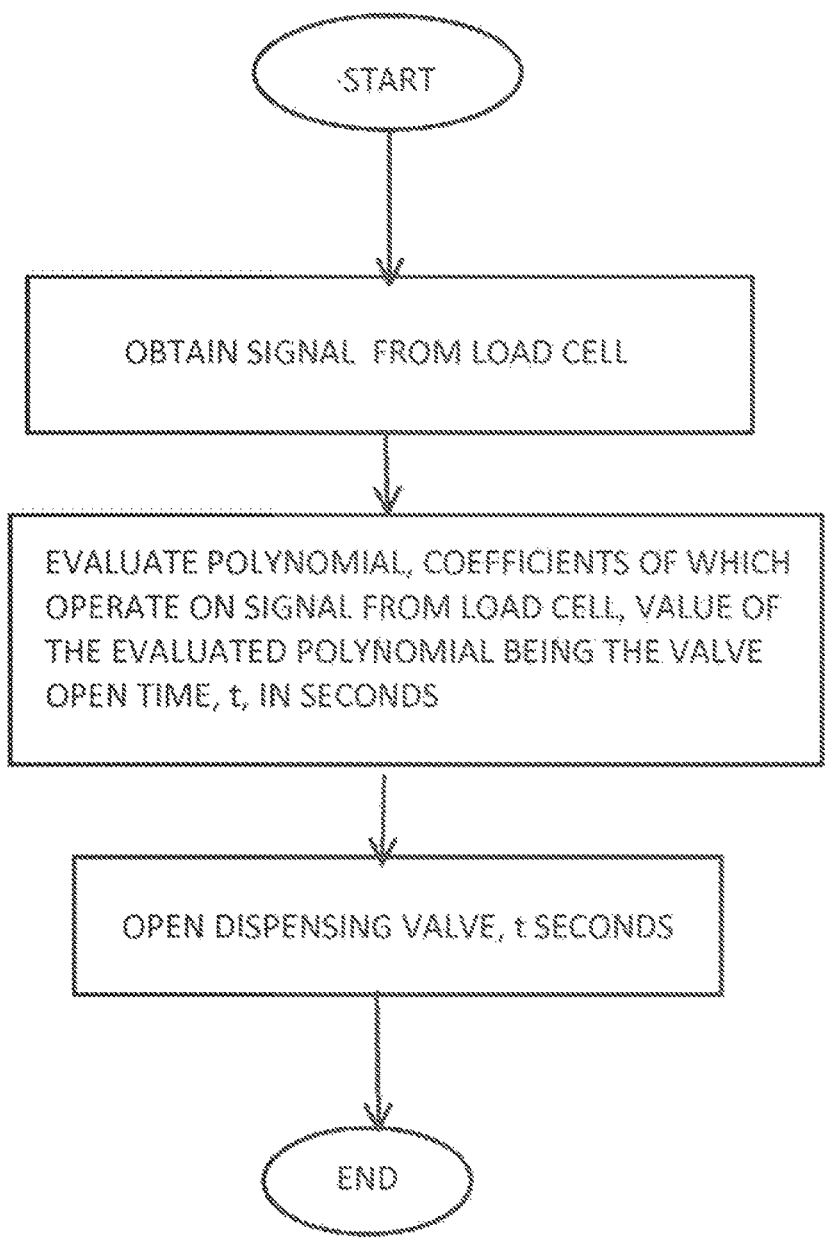
FIG. 15 is a flow chart depicting steps of a method to dispense a volume of liquid.

FIG. 14 shows a plot of a polynomial from which the table may be generated. The load cell output voltage decreases as the liquid in the tank decreases. The valve open time, which is the time required to dispense one ounce of liquid, increases as the load cell output decreases in response to liquid being depleted from the tank. Additional methods and apparatus for determining liquid in a tank are described below.

As mentioned above, the depth D of the liquid determines a static pressure at the valve 40. The static pressure at the valve 40 determines the flow rate of the liquid 45 through the valve 40. The flow rate of the liquid 45 through the valve 40 determines the time that the valve 40 must be held open to dispense a requested volume (or a requested weight of a liquid to be dispensed). The time required to hold the valve open to dispense a particular volume of liquid is therefore dependent on the amount of liquid in a tank, prior to opening the valve 40 since the amount of liquid 45 in a particular tank inherently determines the liquid's height therein. The experimentally determined polynomial described above is thus considered to be one that correlates an amount of liquid in a tank to an amount of time required to hold the valve open to dispense a requested volume. Evaluating the polynomial thus inherently includes a determination of a depth of the liquid in the tank. A valve open time is thus determined empirically, by evaluating the polynomial using for x, the signal output from the load cell prior to opening the valve and which corresponds to the weight supported by the load cell 85.

FIG. 12 shows in greater detail, how the load cell 85 is attached to the underside of the shelf 70 in an embodiment to support at least part of the weight of the tank 50, and how the front of the tank 50 rests on a ridge or fulcrum 75. One end 90 of the load cell 85 is bolted to the underside of the shelf 70. A space is shown between the load cell 85 and the shelf 70 to illustrate that the load cell 85 is essentially cantilevered at the first end 90.

The second end 80 of the load cell 85 supports a vertical post 95. The post 95 extends upwardly from the second end 80 of the load cell 85, through a hole 55 in the shelf 70 and into engagement with the bottom of the tank 50. The load cell 85 thus supports at least half the weight of the tank 50. As the volume of liquid 45 in the tank decreases, the force impressed on the load cell 85 will change accordingly, as will the output signal from the load cell 85. Each time that a volume is requested by a user, the instantaneous value of the load cell output signal is read by the computer 30 and used as an input value of x in the polynomial. Evaluation of the polynomial using appropriate coefficients will yield a value that is the amount of time that the valve should be held open to dispense the requested volume.

Figure 2:
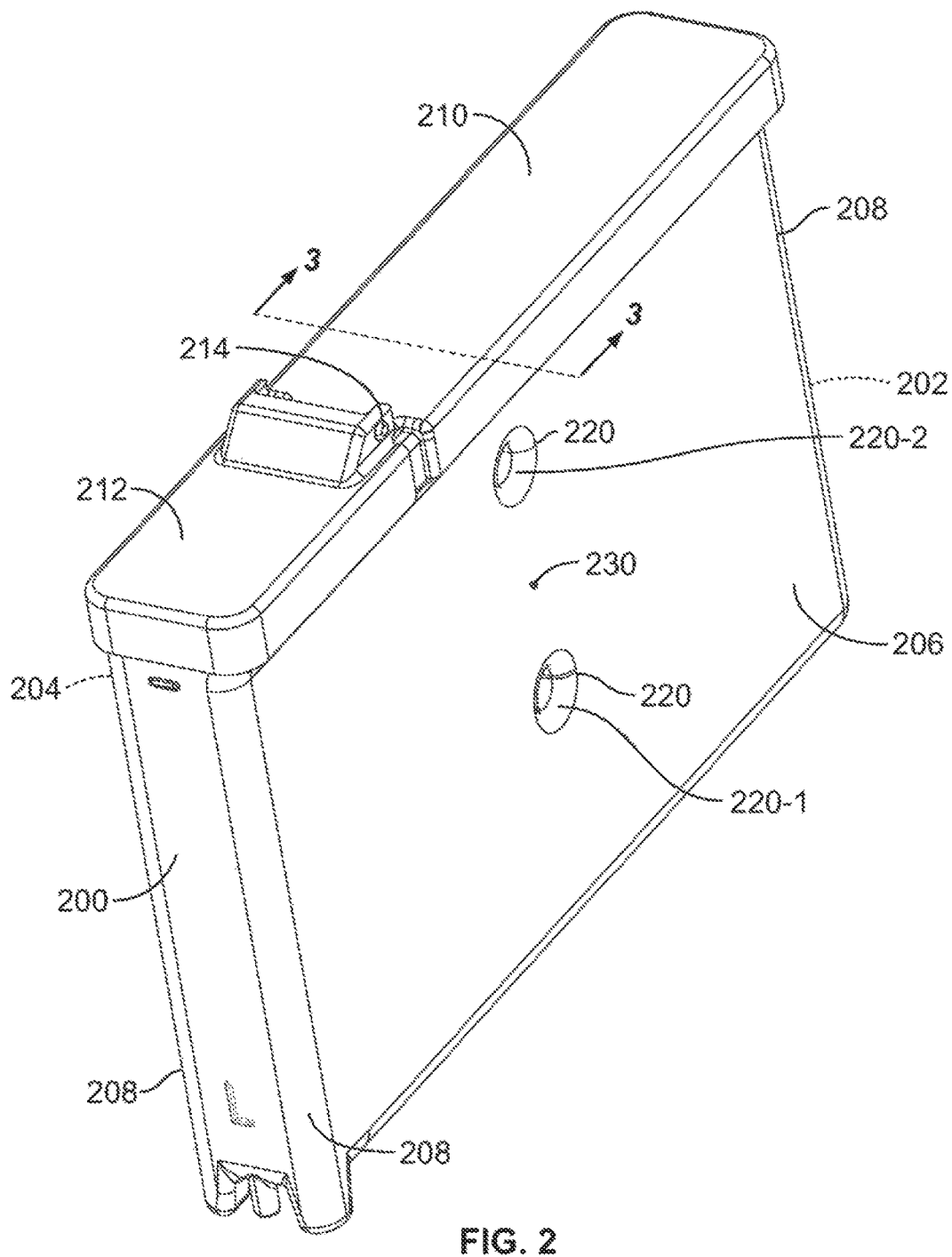
FIG. 2 is a perspective view of the left-hand tank shown in FIG. 1.

FIG. 2 is a perspective view of the left-hand tank 102. The left-hand tank 102 has a substantially planar front face or side 200, a substantially planar rear side or face 202 not visible in FIG. 2, a substantially planar left side 204, not visible, and a substantially planar right side 206. All four sides are substantially planar, i.e., at least their exterior surfaces are flat as well as smooth, and joined to each other by stress-relieving, curved corner sections 208.

The tanks 102, 104 and 106 have substantially equal-sized tops 108. The equal-sized tops 108 makes a tank re-filling task equally convenient (or inconvenient), for each tank. Providing each tank with an equal-sized top 108, however, requires the right-side of the left-hand tank 102 to curve rightward near the tank's top. It also requires the left side of the right-hand tank 106 to curve leftward near the top.

Figure 3:
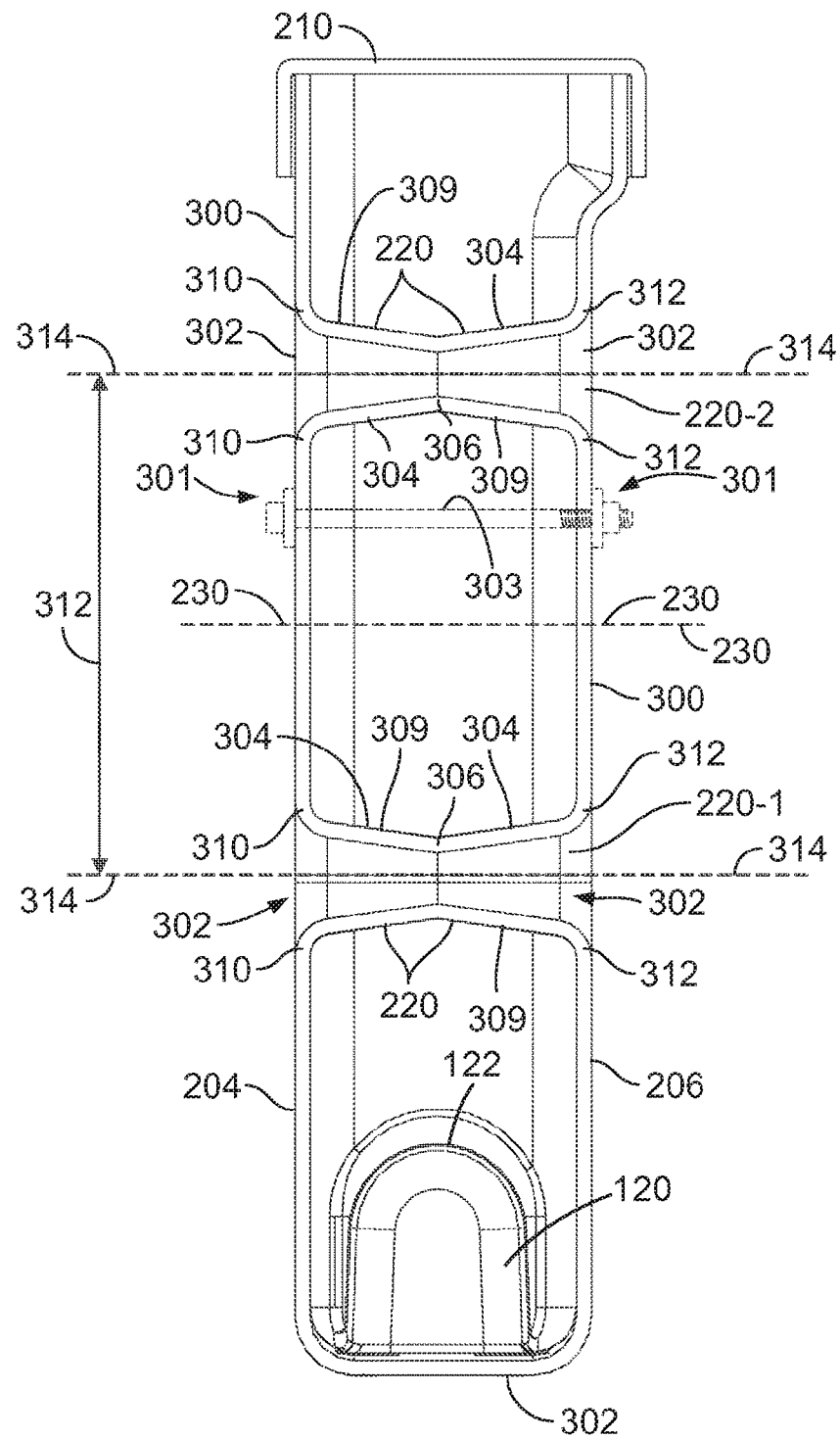
FIG. 3 is a cutaway view of the tank shown in FIG. 2 taken along section lines 3-3.

Each tank shown in FIG. 1, including the left-hand tank shown in FIG. 2 and FIG. 3 has a cover 210 that can also be considered to be a top for a tank. The cover 210 is provided with a hinged door 212, which allows the tank 102 to be refilled. The door 212 is attached to the cover 210 by a hinge and opens by rotation around a hinge pin 214 "rotatably" attached to the cover 210.

The term, "rotatably attached" means that the door 212 is attached to the cover 210 so that the door 212 can rotate along one edge of the cover, about an axis, yet be effectively attached to the cover 210. A hinge provides a rotatable attachment.

The front side or face 200, rear side or face 202, the left side 204, and the right side 206 are considered herein to be walls. As can be seen in the figure, the front wall 200 and the rear wall 202 are substantially parallel to each other as are the left wall 204 and the right wall 206. Minor deviations in the parallelism of the sides are likely to exist at least because of manufacturing tolerances.

Problematic outward deflection and problematic inward deflection is eliminated or at least significantly reduced in thin-walled liquid holding tanks, such as the tanks shown in FIG. 1, by providing sidewalls that oppose each other with sidewall reinforcements or stiffeners. The sidewall stiffeners described herein extend between the walls, but are located inside the exterior surfaces of the sidewalls. They do not add or require a projecting fastener outside the tank's sidewalls. The sidewall stiffeners, which are referred to hereinafter as stringers, are in tension when the tank holds liquid. The stringers help to hold the walls rigid and upright, at least where they are attached to the sidewalls, and thus maintain wall separation distance, at least where they are attached to the sidewalls, when the tank holds liquid.

Except for the cover 210, all four sidewalls, the stringers and the bottom 110 are formed by rotational molding or "roto-molding." Rotational molding is also known as spin casting and "rotocasting." It is a process wherein a thin-walled, two-piece mold is designed to be rotated about two perpendicular axes. Rotational molding is able to produce hollow parts, including the tanks 102, 104, 106 with side wall thicknesses as small as 0.4 millimeters. See, Serope Kalpakjian, et al., Manufacturing Engineering and Technology, 501-502, Pearson Education, Inc. (2010).

To mold the tanks using rotational molding, a premeasured quantity of powered plastic material is placed inside a tank form or mold. The mold is heated as it is rotated around the two perpendicular axes. Rotation of the mold around the two axes tumbles the plastic power against the mold. Depending on the type of plastic, the heat can either fuse the powder or it can melt and coat the mold surfaces. The material in the mold eventually solidifies whereupon the mold is opened and the molded piece removed from the mold.

By forming the tank using rotational molding, the stringers are formed to extend between the sidewalls and are formed seamlessly, i.e., without seams. As used herein, a seam exists where two pieces are joined together and should not be confused with a mold mark And, since the material from which the tank and its stringers are formed is continuous or seamless, a stringer is formed integrally with the sidewalls during the spin molding process. A stringer is thus considered herein to be part of, or formed with the sidewalls. The rotational molding process also enables the stringers to be formed inside the tank without a projection or protuberance above the outside surfaces of the sidewalls as a thru-bolt might require. The thickness of the sidewalls and the stringers formed with them are also the same or substantially the same. The stringers do not require any sort of localized sidewall mounting boss or reinforcement that a thru-bolt recessed into a sidewall might require.

In FIG. 2, the left wall 204 and the right wall 206 are reinforced and helped to stay vertical by at least one stringer that extends between the sidewalls 204 and 206. FIG. 2 shows two stringers 220-1 and 220-2. They are formed during the same spin casting process during which the sidewalls 204 and 206 are formed. The stringers are thus part of the sidewalls 204 and 206 that oppose each other. The stringers 220-1 and 220-2 are hollow and because they are formed during the spin casting process, they are as thin as the sidewalls but nevertheless significantly reduce outward and inward deflection of the sidewalls 204 and 206.

FIG. 3 is a cross sectional view of the tank 102 shown in FIG. 2 taken through section lines 3-3. FIG. 3 depicts the left-side tank shown in FIG. 1. The outside surfaces 300 of the sidewalls 204 and 206 are depicted as being upright or at least substantially upright, vertical or at least substantially vertical, and planar or at least substantially planar, i.e., without a projection such as a thru-bolt 301 that would be required if the sidewalls were to be reinforced or stiffened by such a structure, and smooth.

FIG. 3 further depicts a detent 120 that extends into the interior of the tank 102 from the bottom 302 near the rear wall 202. In the embodiment depicted, the detent 120 includes a rounded end 122. As described above, when the tank 102 is used in a dispenser, the tank may engage a load cell in the area near the bottom and rear walls of the tank. In an embodiment, the detent 120 may facilitate this engagement.

The stringers 220-1 and 220-1 are essentially hollow elongated cylinders or tubes. They can be seen to be "similar" to each other. Except for their locations in the side walls 204 and 206, the second stringer 220-2 has the same or substantially the same attributes of the first stringer 220-1.

While the stringers 220-1 and 220-2 are essentially tubes, which have themselves a sidewall, both stringers have cross-sectional shapes reminiscent of a venturi, when viewed along section lines 3-3. The stringers have a relatively large inside diameter at the tank sidewalls 204, 206. The stringers' diameter narrows continuously throughout the length of a tapered region 304 of the stringers. The inside and outside diameters of the stringers narrows to a constriction, also referred to as an inflection point 306 where the stringer's inside diameter is most narrow. The relatively large taper of the stringers that imbues them with a venturi-like cross sectional shape is attributable to the draft used in the mold from which the tank is made. The larger the draft used in a mold the easier it is to remove a molded part. The draft of the stringer is preferably between about two degrees and twenty degrees to enable the molded tank 102 to be easily removed from the mold in which it is formed.

As used herein, the terms "draft," "draft angle" and "taper" refer to an angle of a surface relative to a reference, typically vertical or horizontal, which is provided to a mold to enable of a part from the mold after the part has solidified. The ease with which a molded object can be removed from a mold depends in part on the draft angle used in the mold. Draft angles can be small for molded metals, e.g., slightly greater than one (1) degree, however, draft angle are usually larger for molded plastics. The draft angle us usually measured with respect to a vertical line or axis but can be measured relative to a horizontal line or other reference line.

Those of ordinary skill in the art will recognize that the tanks can be made from separately-molded tank halves that are mirror "images" of each other or substantially mirror images of each other. Tanks formed from separate halves are joined together after being molded by heating or an adhesive.

A hollow stringer 220 reduces the weight and thus the cost of the tanks but an additional benefit of a hollow stringer is that air can flow through the open space inside the hollow stringer. Air inside a stringer can enhance heat transfer into or out of a liquid inside the tank. By way of example, air inside a stringer 220 that is cooler than the stringer material 309, or that is cooler than liquid inside the tank will absorb heat. Air in a stringer 220 that is warmer than the stringer material 309 or warmer than liquid in the tank will transfer heat into the stringer and thus into the liquid in the tank. A stringer is thus considered to also be a heat exchanger.

Despite the fact that the stringers 220-1 and 220-2 are integrally formed with the sides, are continuous and seamless, for purposes of claim construction, the stringers 220-1 and 220-2 are considered herein to have opposing first and second ends, 310 and 312 respectively. The lower or first stringer 220-1 has a first end 310 located at but also forming part of the left-hand wall 204; a second end 312 is located at but also forming part of the right-hand wall 206. Similarly, the upper or second string 220-2 has a first end 310 located at and forming part of the left-hand wall 204 and a second end 312 located at and forming part of the right-hand wall 206. The stringers are preferably formed to be substantially orthogonally, i.e., at a right angle to the sidewalls that they reinforce.

In FIG. 2 and FIG. 3 the stringers 220-1 and 220-2 are vertically separated from each other. The distance between the stringers is considered to be a stringer separation distance 312. The stringer separation distance is selected to keep the center line 314 of each stringer 220 equidistant or substantially equidistant in a vertical direction, i.e., above or below, a geometric point or location on the sidewalls 204 and 206, which is considered herein to be a "centroid" for each side 204 and 206.

The geometric center of the sides, i.e., the centroid in each wall, is identified by reference numeral 230. The stringer separation distance 312 is considered herein to be the distance between a geometric axis or center line 314 of each of the two stringers. In one embodiment of a holding tank with internally-reinforced sidewalls, the wall stiffener is located between the sidewalls at the centroids of each wall. In preferred embodiments, wherein multiple stiffeners are used, the stiffeners can be spatially separated from each other and located in the sidewalls to be equidistant or substantially equidistant from the centroid 230 in order to equalize the retention force provided by each stringer. In an alternate embodiment, two or more stringers are horizontally separated from each other in the sidewalls to be at the same level or distance from the bottom 110 of the tank but on either side of the centroid 230. In yet another embodiment having four stringers, two of the four stringers being located as shown in FIG. 3, two other stringers being laterally separated from each other on either side of the centroid 230 and at the same distance from the bottom 110.

Figure 4:
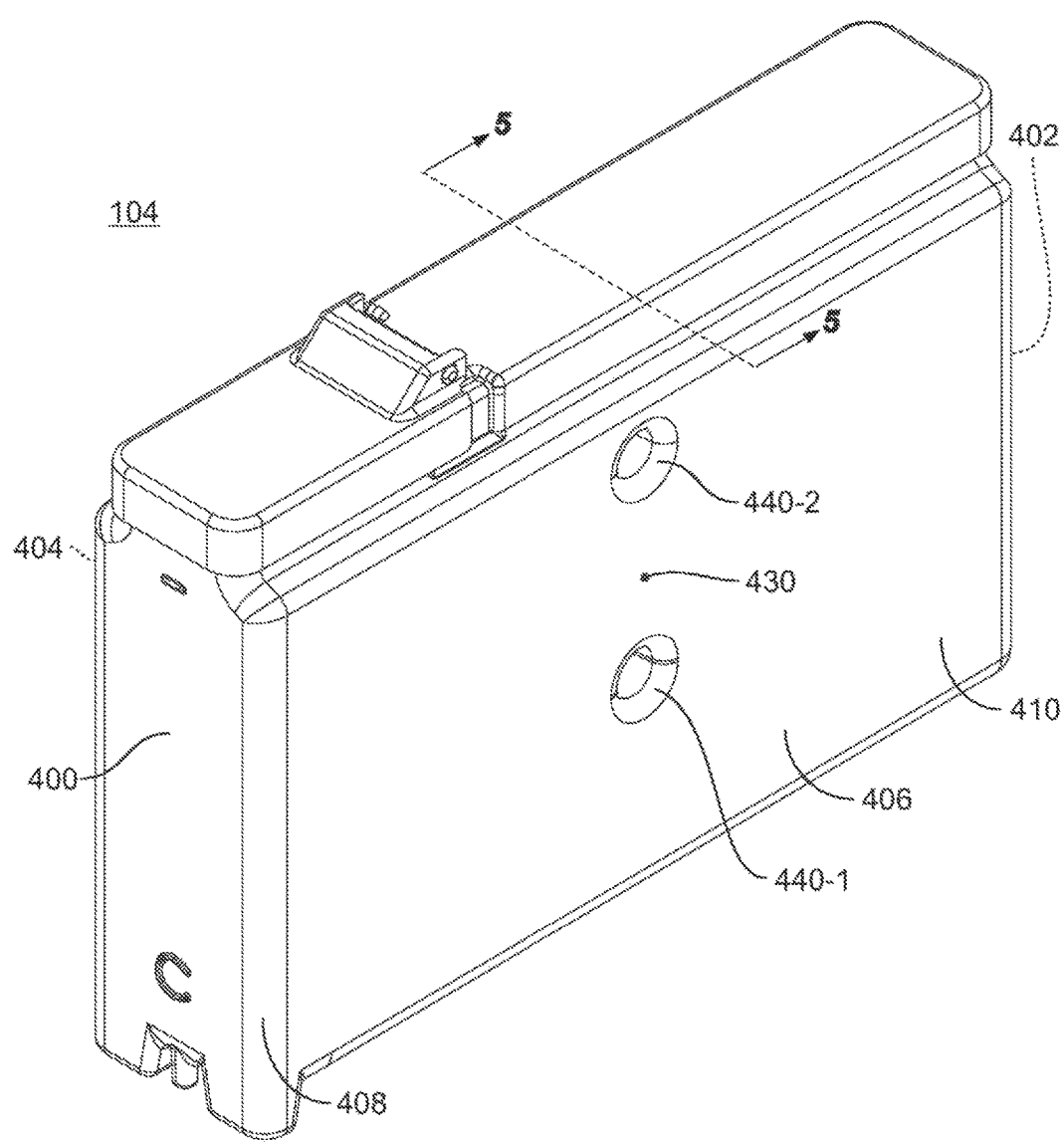
FIG. 4 is a perspective view of the center tank shown in FIG. 1.

FIG. 4 is a perspective view of the center tank 104 shown in FIG. 1. As with the tank shown in FIG. 3, the walls are upright, substantially planar and have exterior surfaces that are substantially smooth. The center tank 104 has a front wall 400 and an opposing rear wall 402. Similarly it has a left-hand wall 404 and an opposing right-hand wall 406. The four walls, 400, 402, 404 and 406 are substantially planar and joined to each other by stress-relieving, curved corner sections 408. The opposing left and right sidewalls 404 and 406 are held substantially upright with smooth exterior surfaces 410. Their outward and inward deflection is reduced or eliminated by two stringers 440-1 and 440-2, both of which are hollow to allow air to flow in and through them, both of which extend between the two opposing sidewalls 404 and 406. As with the stringers 220-1 and 220-2 depicted in FIGS. 2 and 3, the stringers 440-1 and 440-2 are also formed together with the sidewalls and are thus continuous and seamless with the sidewalls, i.e., the stringers are formed integrally with the rest of the tank.

Figure 5:
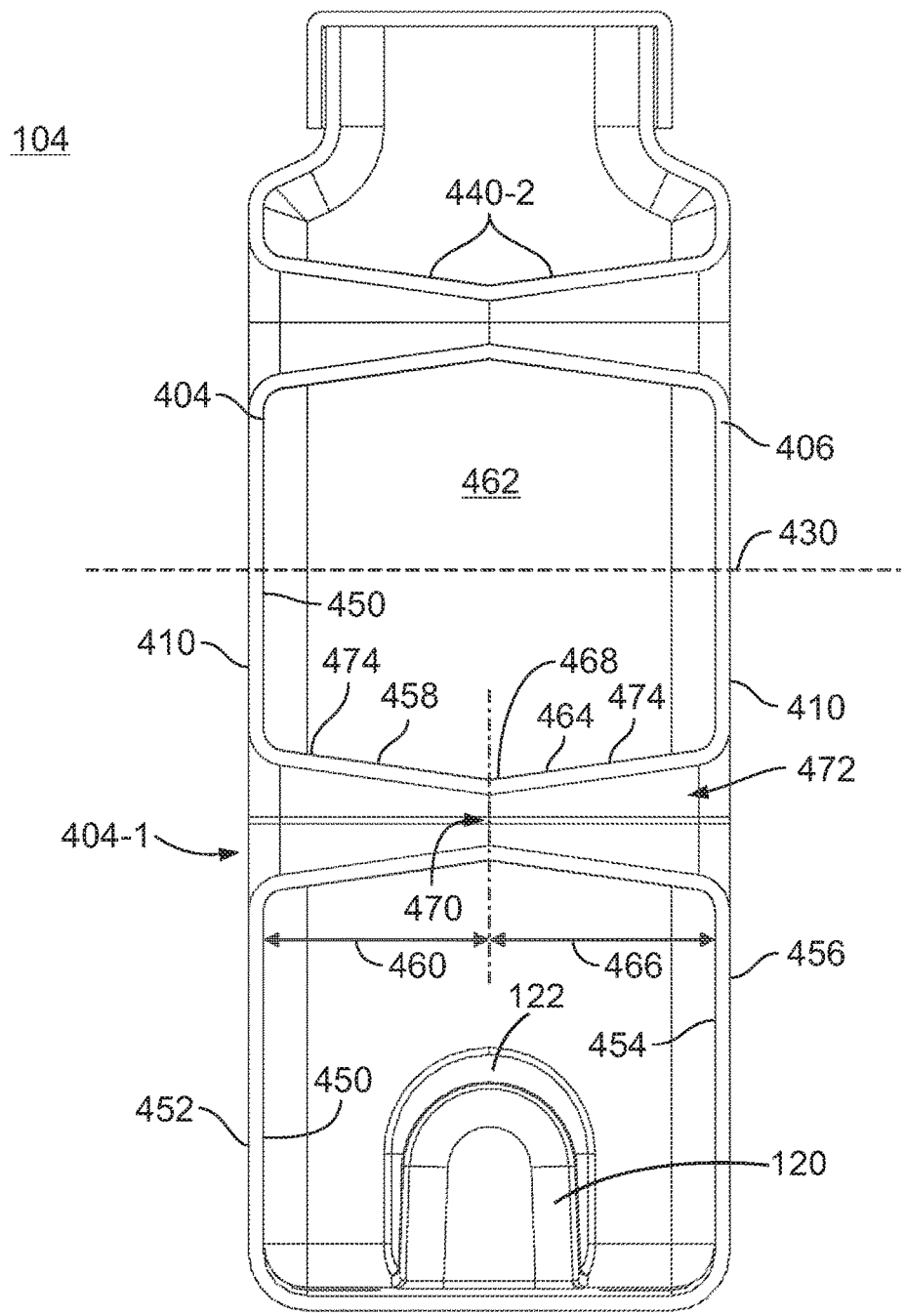
FIG. 5 is a cutaway view of the tank shown in FIG. 4 taken along section lines 5-5.

The center tank 104 is shown in cross section in FIG. 5, which is a cross section through section lines 5-5. The center tank 104 is also formed by rotational molding. As with the stringers used in the left-hand tank, the stringers 440 used in the center tank are preferably located in the sidewalls so that they are vertically above and below and equally separated from what is considered herein to be a centroid or geometric center 430 for the left side wall 404 and the right-hand wall 406. Alternate embodiments include a tank with laterally or horizontally separated stringers located on either sides of the centroid 430.

FIG. 5 further depicts a detent 120 that extends into the interior of the tank 104 from the bottom near the rear wall 602. In the embodiment depicted, the detent 120 includes a rounded end 122. As described above, when the tank 104 is used in a dispenser, the tank may engage a load cell in the area near the bottom and rear walls of the tank. In an embodiment, the detent 120 may facilitate this engagement.

As used herein, the centroid is considered to be a geometric center of the side walls. The actual location of the centroid will vary depending upon the geometry of the sidewalls.

For purposes of claim construction, the walls of each tank are thin but nevertheless have two opposing surfaces referred to as "interior" and "exterior" surfaces. As shown in FIG. 5, which is a cross-sectional view of the middle tank 104 shown in FIG. 4, a first interior surface 450 faces into the tank; a second exterior surface 452 faces outwardly. Both surfaces are preferably smooth.

The right-side wall 406 is also thin and it too has opposing surfaces 454 and 456. A first, interior surface 454 of the right-side wall 406 faces into the tank; a second opposing exterior surface 456 is smooth and faces outwardly.

A first portion 458 of a wall stiffener or "stringer" 440 extends into the tank 104 from the left-side wall 404. The first portion 458 is tapered and has a length 460 that extends into the interior 462 of the tank 104. A second portion 464 of the stiffener 440, which is also tapered, extends inwardly from the interior surface 454 of the right side wall 406. The second portion 464 has its own length 466, which is preferably equal to the first length 460. The length 460 of the first portion 458 is measured from the vertical, internal center line 470 of the tank 104 to the internal surface 450 of the left side 404. The length 466 of the second portion 464 is measured from the internal center line 470 to the internal surface 454 of the right side 406. While the lengths 460 and 466 are depicted in FIG. 5 as being equal or at least substantially equal, the lengths of the portions of the stringers can in fact be different from each other. As with the stringers 220-1 and 220-2, air can flow into and through the stiffeners 440-1 and 440-2 shown in FIGS. 4 and 5.

Figure 6:
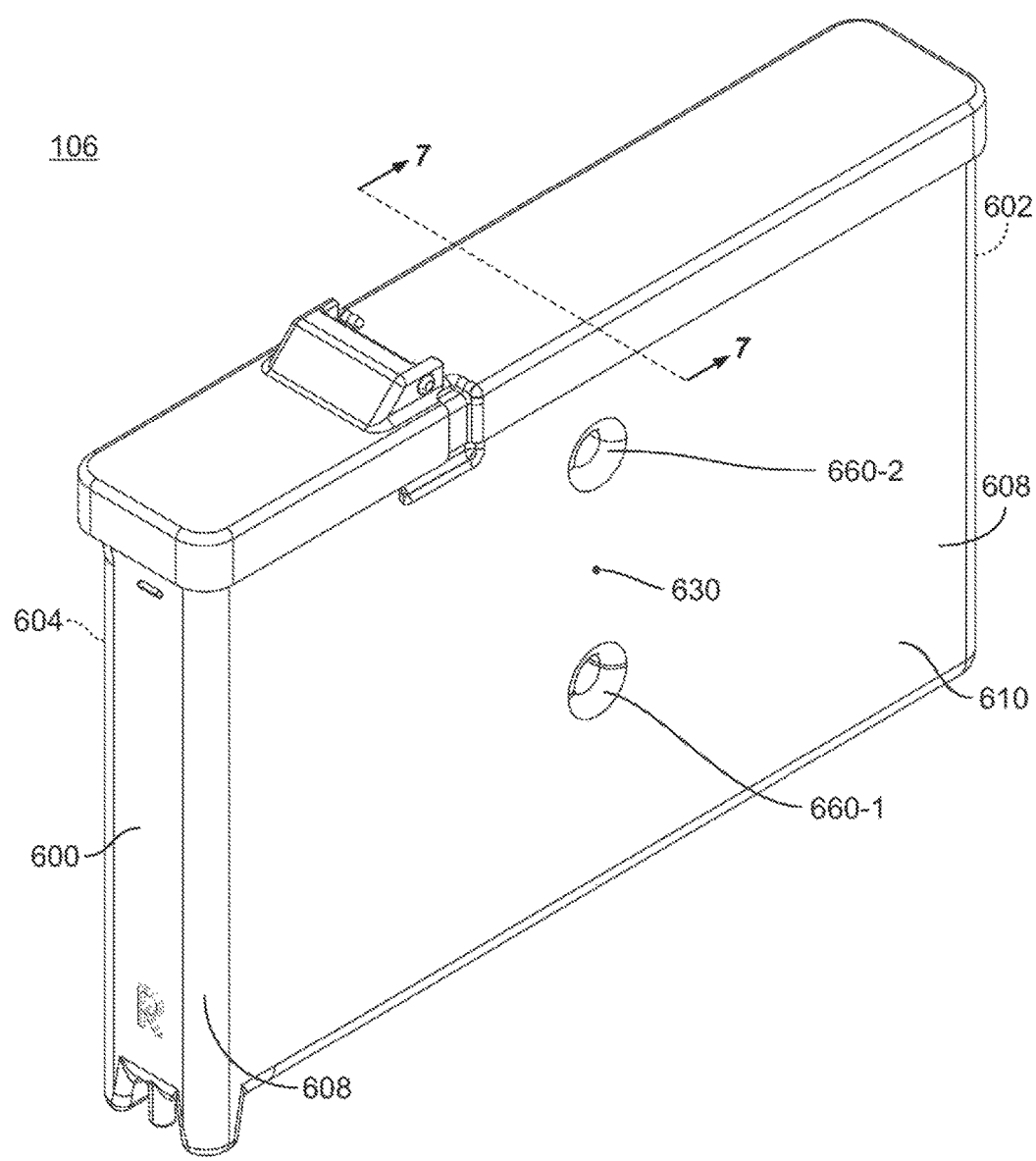
FIG. 6 is a perspective view of the right-hand tank shown in FIG. 1.

FIG. 6 is a perspective view of the right-hand tank 106 shown in FIG. 1. As with the other two tanks, the right-hand tank 106 has four walls, 600, 602, 604 and 606, joined to each other by stress-relieving curved sections 608. The front wall 600 and the opposing rear wall 602 are substantially planar, and parallel to each other. The left wall 604 and the right wall 606 are planar, have exterior surfaces 610 that are smooth and which are substantially parallel to each other. Two stringers 660-1 and 660-2 that extend inwardly from the sidewalls resist outward and inward deflection of the sidewalls when the tank is filled or partially filled with liquid, not shown.

Reference numeral 630 identifies the location of a centroid or geometric center of the sidewalls 604 and 606. The stringers 660-1 and 660-2 extend inwardly from the left-hand wall 604 and inwardly from the right-hand wall 606, as they do with the other two tanks described above.

Figure 7:
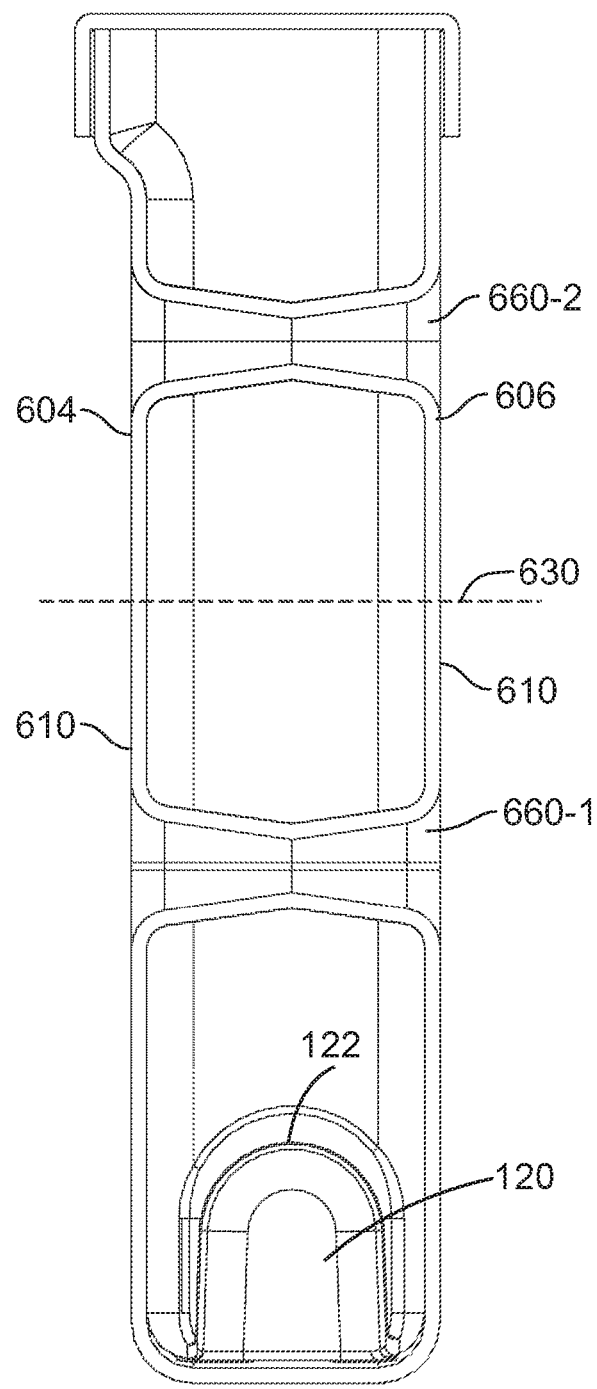
FIG. 7 is a cutaway view of the tank shown in FIG. 6 taken along section lines 7-7.

The right-hand tank 106 is shown in cross section in FIG. 7. As with other tanks described above, the tank 106 shown in FIGS. 6 and 6 and the included stringers 660-1 and 660-2 are formed by rotational molding. The stringers 660-1 and 660-2 are preferably located in the sidewalls 604 and 606 so that they are above and below and equally separated from a centroid 630 for the left side wall 604 and the right-hand wall 606, in order to evenly distribute the sidewall retaining forces they provide to the sidewalls.

FIG. 7 further depicts a detent 120 that extends into the interior of the tank 106 from the bottom near the rear wall 602. In the embodiment depicted, the detent 120 includes a rounded end 122. As described above, when the tank 106 is used in a dispenser, the tank may engage a load cell in the area near the bottom and rear walls of the tank. In an embodiment, the detent 120 may facilitate this engagement.

For purposes of claim construction, two more sidewall-reinforced tanks, such as the three sidewall-reinforced tanks 102, 104 and 106 shown in FIG. 1, are considered herein to be an assembly of reinforced liquid holding tanks. Each tank has at least two opposing sidewalls, the exterior surfaces of which are preferably smooth, nominally parallel to each other and separated from each other by a separation distance substantially equal to the width, w, of the tank. The sidewalls of a tank are kept substantially parallel to each other by at least one wall stiffener that extends inwardly from, and between the two opposing sidewalls. The stiffener is a structure that is formed as part of the opposing sidewalls or which is attached to or joined to the sidewalls such that the stiffener does not require a protuberance above the exterior surface of a tank sidewall providing the exterior surface of the sidewall with a smooth surface. The fact that the sidewalls are smooth and kept vertical or substantially vertical reduces and can even eliminate friction between adjacent tanks in a cabinet. That the sidewalls are smooth can also enhance heat transfer between tanks, the sidewalls of which are in contact with each other or with the interior sidewalls of a temperature-controlled cabinet such as a refrigerator.

A liquid dispenser with liquid holding tanks having reinforced sidewalls as described above, the tanks of which are able to move vertically with respect to each other even while they contain liquid, can be realized by combining the tanks described above with a refrigerated liquid dispenser as described in the Applicant's co-pending patent application having U.S. patent application Ser. No. 13/169,339, filed Jun. 27, 2011 and which is entitled "Liquid Dispenser with Storage Tanks" The entire contents of that patent application (application Ser. No. 13/169,339) are therefore incorporated herein by reference. When two or more reinforced tanks as described above are used in a liquid dispenser, such as the one described in U.S. patent application Ser. No. 13/169, 339, one advantage is that the friction between the sides of adjacent tanks is reduced because the sides of the tanks are kept upright. An additional advantage is realized by the stringers' facilitating heat transfer between air inside the hollow stringers of the different tanks that are aligned with each other and temperature-controlled sidewalls of a cabinet. Aligned hollow stringers form a heat exchanger, which is effectively located inside the tank and effectively immersed in liquid in the tank.

Figure 16:
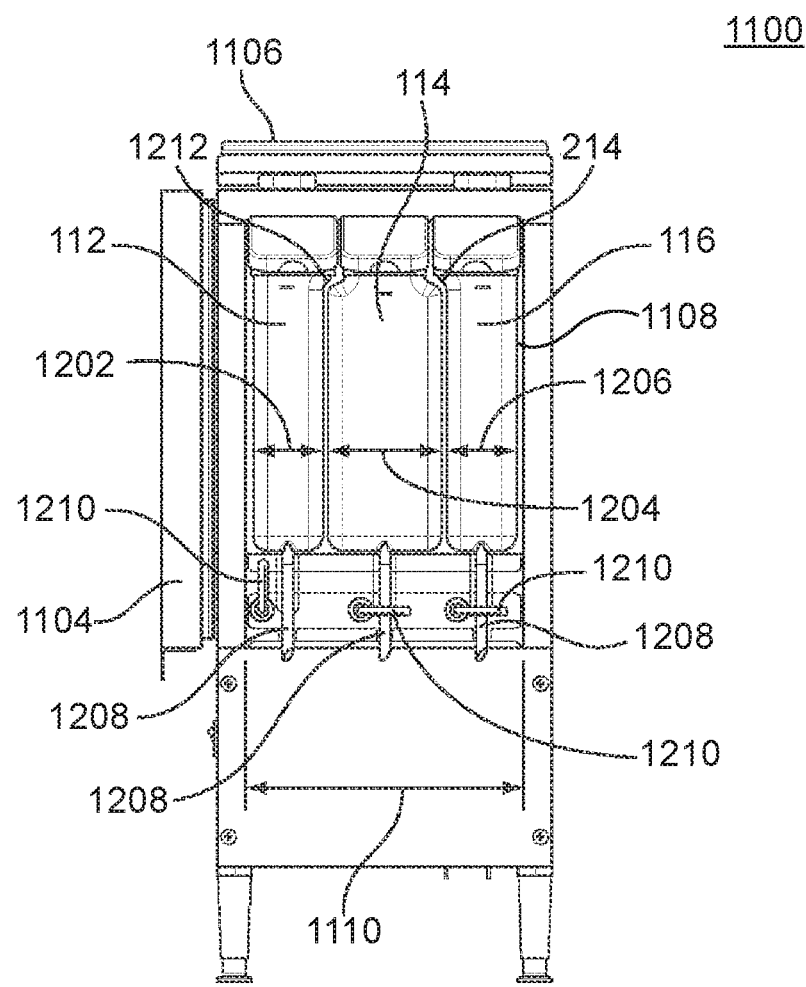
FIG. 16 is a front elevation view of the liquid dispenser.

FIG. 16 is a front elevation view of the liquid dispenser 1100. A first tank 112 is positioned to the left side of a center tank 114. A right side tank 116 is positioned to the right side of the center tank 114. The left side tank 112 has a width 1202; the center tank 114 has a larger width 1204. The right side tank 116 has a width identified by reference numeral 1206. The combined widths 1202, 1204 and 1206 fit within the width 1110 of the refrigerated compartment 1108. Each of the tanks 112, 114 and 116 has a dispensing tube 1208 that extends downwardly from the tank through a pinch bar of a pinch valve 1210.

One example of a pinch bar and pinch valve is disclosed in the applicant's U.S. Pat. No. 8,376,310 and entitled Pinch Valve. The content of said patent is incorporated in its entirety herein by reference.

Another example of a pinch bar and pinch valve is disclosed in the applicant's U.S. Pat. No. 8,636,176 and is entitled Liquid Dispenser Pinch Valve. The content of said application is also incorporated in its entirety herein by reference.

Figure 17:
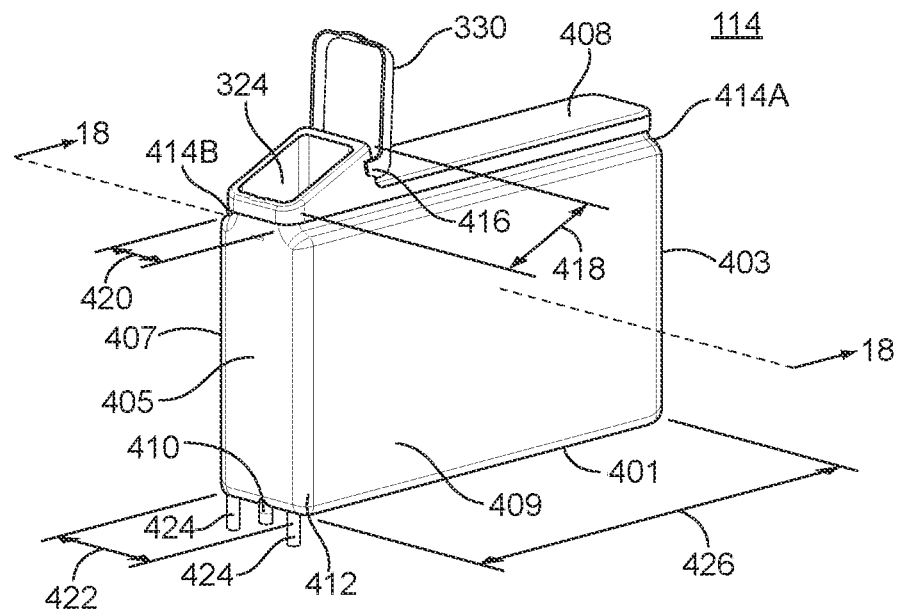
FIG. 17 is a perspective view of the center tank.

FIG. 17 is a perspective view of the center tank 114. The center tank 114 is one of three tanks sized, shaped and arranged to fit within the width 1110 of the refrigerated interior compartment 1108 of the dispenser 1100. The center or middle tank 114 can be seen in FIG. 17 as having a shape substantially the same as a rectangular parallelepiped or cuboid. A parallelepiped is a six-faced polyhedron all of the faces of which are parallelograms and lying in pairs of parallel planes.

The center tank 114 has a bottom wall or surface 401, a back side or wall 403, a front side or face 405, a right side 409, an opposing left side 1407, and a top 408. A small cylinder 410 can be seen projecting downwardly from the bottom 401. The cylinder 410 is a drain for the tank 114. Liquid stored in the tank 114 flows through the cylinder 410 into a dispensing tube 1208 into which the cylinder 410 is inserted. The cylinder 410, which is preferably formed of the same material as the tank 114, is protected from breakage by two legs 424 that extend downwardly from the bottom 401 of the tank 114.

Except for the top 408, the tank 114 is molded. The corners 412 are thus rounded imbuing the side walls 403, 405, 407 and 409 with an uninterrupted connection or union between them. The rounded corners 412 and the side walls 403, 405, 407 and 409 can thus be considered as a continuous side wall or as four separate side walls separated by the rounded corners 412.

The top 408 has incorporated within it opening 324 and a cover 330. The cover 330 is hinged 416 to the top 408 by which the cover 330 can be rotated around the hinge 416 between an opened and closed position.

The opening 324 has a width 420 and a length or depth 418. The product of the depth 418 and the width 420 is substantially equal to the open area through which a liquid can be poured into the tank 114 to refill it.

As used herein, the term, "substantially equal" means that in one embodiment, a cover for one opening will fit the other openings with a fit or seal, the tightness of which is substantially the same between them, regardless of the tank volumes. In another embodiment, "substantially equal" means that the areas of the openings in the different tanks vary by less than about ten percent (10%) regardless of the tank volumes. Stated another way, one opening in one tank is not more than ten percent larger or smaller than another opening in another tank. In another embodiment, "substantially equal" means that the areas of the openings vary by less than about twenty percent (20%) regardless of the tank volumes. One opening in one tank is not more than twenty percent larger or smaller than another opening in another tank. In yet another embodiment, the openings are "substantially equal" if the areas of the openings vary by less than about thirty percent (30%) regardless of the tank volumes.

The tank 114 has a width 422 defined herein as the separation distance between the right side 409 and the left side 407. In the embodiment shown, the right side 409 and the left side 407 are both substantially vertical and parallel to each other almost completely from the bottom 401 to the top 408. The width is identified in FIG. 4 by reference numeral 422. It can be seen that the width 420 of the opening 324 is less than the width 422 of the tank itself 114. The reduced width 420 of the opening 324 is due in part to an arcuate, by which is meant, curved like a bow, or an otherwise curving transition section 414A and 414B on the right side 409 and the left side 407. The transition sections or transition portions reduce the width of the tank 114 from its nominal width identified by reference numeral 422 to the width 420 of the opening 324. The transition sections 414A and 414B of the middle tank 114 thus reduce the width dimension 422 of the tank at or near the top of the tank 114 because the transition sections or portions are complementary to each other.

The transition sections 414A and 414B are considered herein to be complementary because they are shaped to be mirror images of each other. By way of example, the right side transition section 414A has a curvature that transitions or moves the right side wall 409 inwardly or toward the left side wall 407. The left side transition portion 414B has a curvature that moves or transitions the left side of the tank 407 inwardly or toward the right side 409. The right side transition section 414A and the left side transition section 414B move the respective sides an equal distance inwardly. The transition sections are thus considered to be complements of each other.

Figure 18:
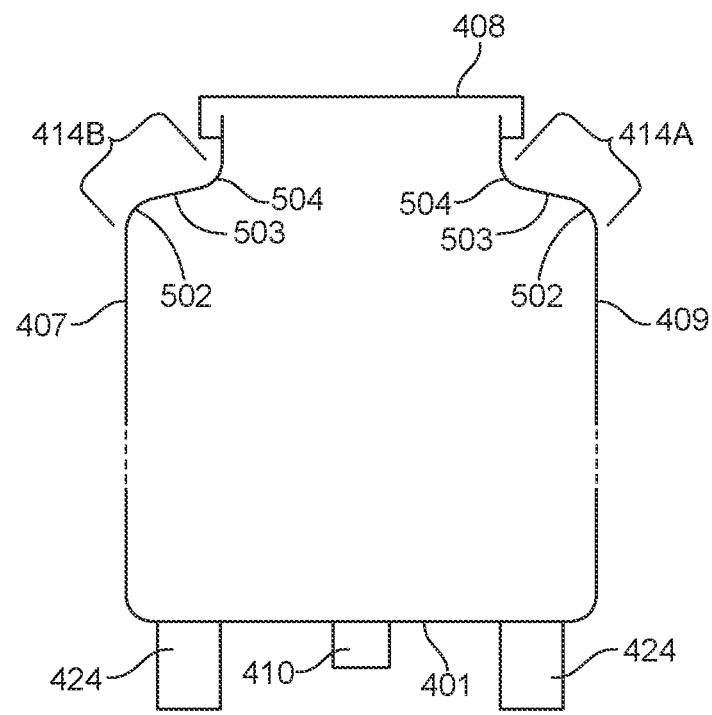
FIG. 18 is a cross section of the center tank taken through section line 18-18.

FIG. 18 is a cross section of the center tank 114 taken through section lines 18-18. The transition sections 414A and 414B have inwardly curving sections 502 relatively straight intermediate sections 503 and outwardly curving sections 504. The transition sections 414A and 414B thus have a cross-sectional shaped serpentine in nature or boustrophedonic.

Figure 19:
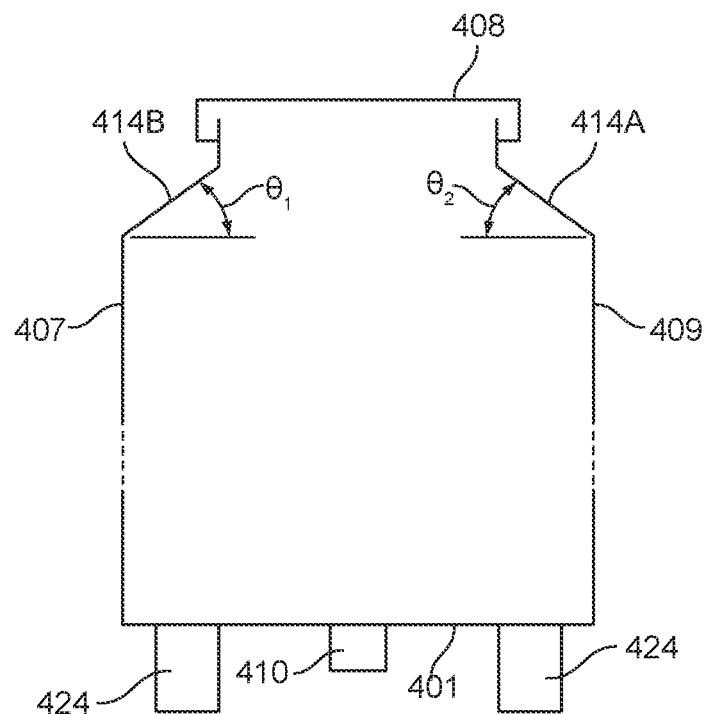
FIG. 19 is a cross section showing an alternative embodiment of the center tank taken through section line 18-18.

FIG. 19 is another cross-sectional view of the middle tank 114 taken through section lines 18-18, but showing an alternate embodiment of the transition sections 414A and 414B. In FIG. 19, the transition sections are depicted as substantially straight lines inclined at angles 81 and 82 relative to horizontal. The relatively straight transition portions 414A and 414B are thus considered to be angular in shape, the term "angular" meaning forming an angle.

Figure 20:
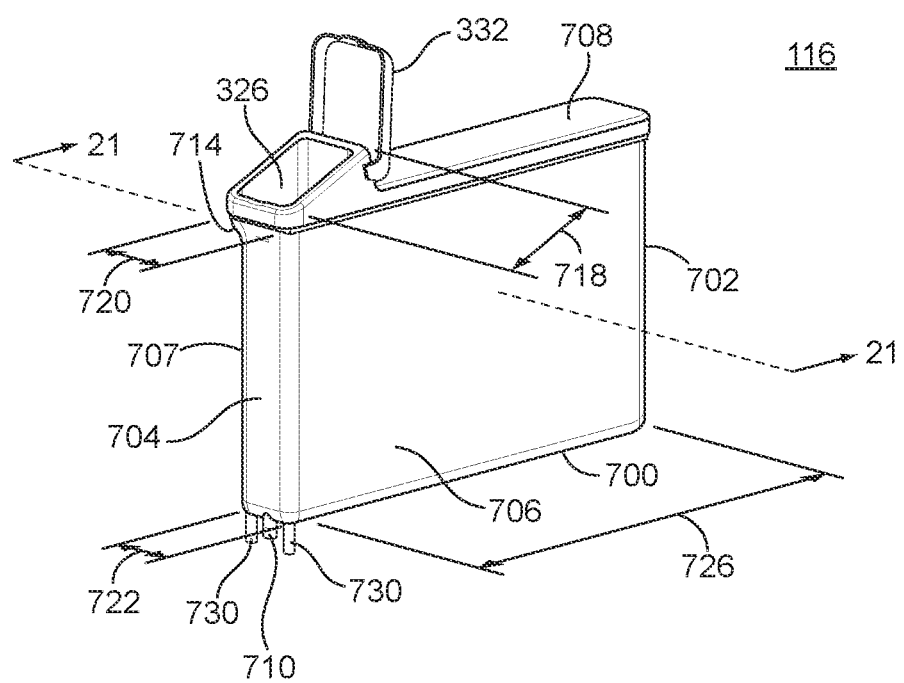
FIG. 20 is a perspective view of the right-hand tank.

FIG. 20 is a perspective view of the right-side tank 116. The tank 116 has bottom 700, a rear side or face 702, a front side or face 704, a right side 706, a left side 707 and top 708. The cylinder 710 is a drain for the right side tank 116. As with the center tank 114, liquid stored in the right-side tank 116 flows through the cylinder 710 into a dispensing tube 1208 into which the cylinder 710 is inserted. The cylinder 710, which is preferably formed of the same material as the tank 116, is protected from breakage by two legs 730 that extend downwardly from the bottom 700 of the tank 116.

The tank 116 has width measured just above the bottom 700 that is identified by reference numeral 722. A width at the top 708 is identified by reference numeral 720. As shown in the figure, the top width 720 is significantly greater than the bottom width 722. The increased width at the top 720 over the bottom 722 is due to a transition portion identified by 714. The transition portion 714 of the right side tank 116 increases the width of the tank to be substantially equal to the width 420 at the top 408 of the middle tank 114.

Figure 21:
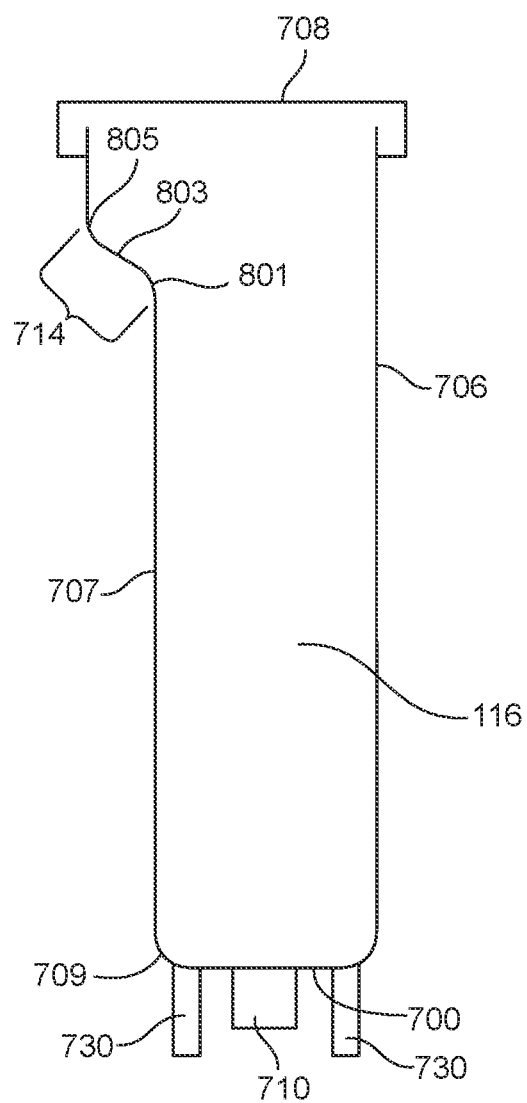
FIG. 21 is a cross section view of the right-hand tank taken through section line 21-21.

FIG. 21 is cross-sectional view of the right side tank 116 taken through section lines 21-21. The transition portion 714 has an outwardly curving section 801 connected to a substantially straight intermediate section 803, which is followed by or connected to an inwardly curving section 805. The transition section 714 for the right hand side tank 116 can thus also be characterized as serpentine or boustrophedonic.

Figure 8:
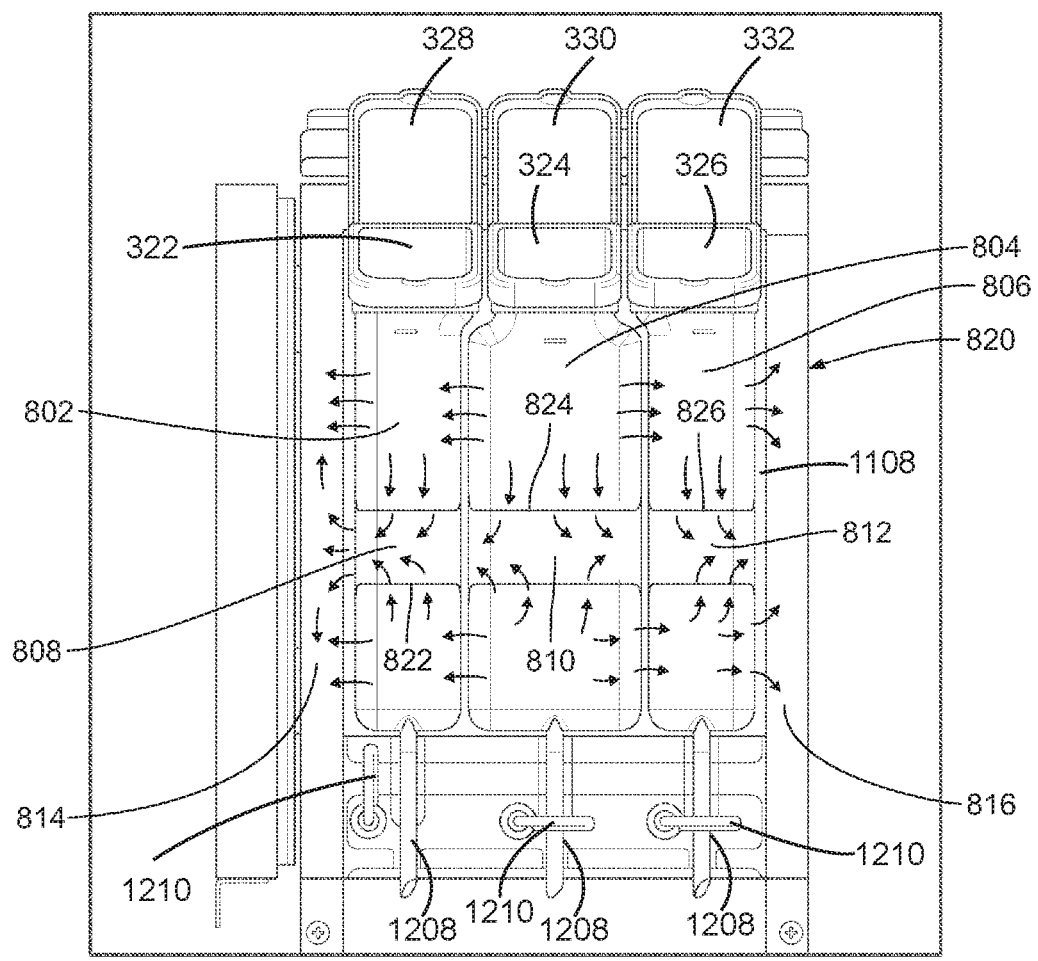
FIG. 8 is a front elevation view of a liquid dispenser having holding tanks with reinforced sidewalls.

Referring again to FIG. 20, it can be seen that the opening 326 and the top 708 also has an area determined by the product of the depth 718 by the width 720. As shown in FIG. 8 an FIG. 16, the area of the openings in both the center and right-hand side tanks 114 and 116, respectively, are the same which is due to the fact that the transition areas for the middle tank 114 squeeze or reduce the width of that tank while the transition section 714 of the right-hand tank 116 enlarges or increases the width 722 of the right-hand tank 116. It can also be seen that the depth 726 of the right-hand tank 116 is substantially equal to the depth 426 of the center tank 114. The top portions of both tanks are thus substantially equal in as much as the width of the top 408 of the center tank 114 is substantially equal to the width 720 of the top 708 of the right-hand tank 116.

Figure 22:
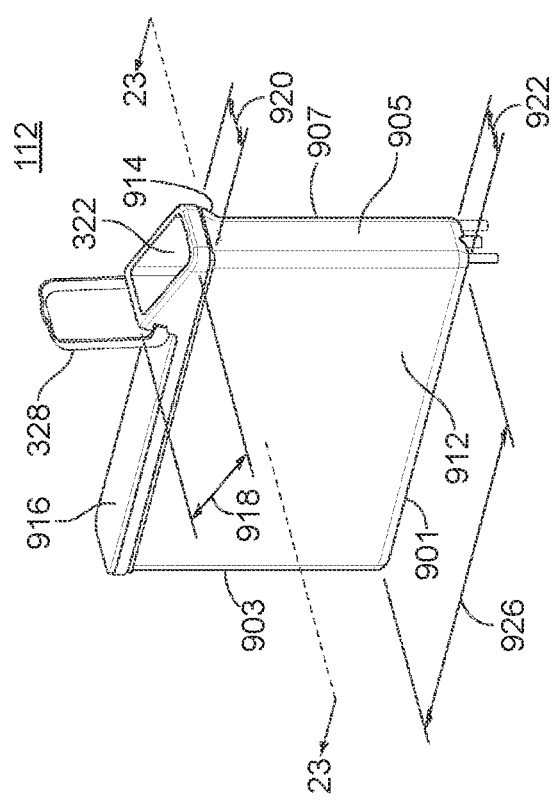
FIG. 22 is a perspective view of the left-hand tank.

FIG. 22 is a perspective view of the left-side tank 112. The tank 112 has a bottom 901, a rear side or face 903, a front side or face 905, a right side 912, a left side 907 and top 916. The tank 112 has width measured just above the bottom 901 that is identified by reference numeral 922. A width at the top 916 is identified by reference numeral 920. As shown in the figure, the top width 920 is greater than the bottom width 922. This is a similar situation as occurs with the right side tank. The increased width of the left side tank at the top 920 over the bottom 922 is due to a transition portion identified by 914. The transition portion 914 of the left side tank 112 increases the width of the tank to be substantially equal to the width 420 at the top 408 of the middle tank 114.

Figure 23:
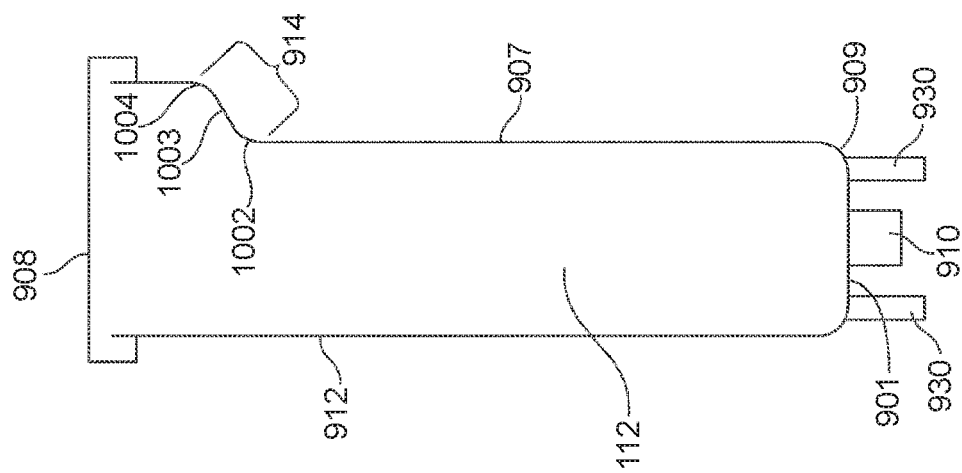
FIG. 23 is a cross section view of the left-hand tank taken through section line 23-23.

FIG. 23 is cross-sectional view of the left side tank 112 taken through section lines 10-10. The cylinder 910 is a drain for the right side tank 112. As with the center tank 114 and the right-side tank 116, liquid stored in the left-side tank 112 flows through the cylinder 910 into a dispensing tube 1208 into which the cylinder 910 is inserted. The cylinder 910, which is preferably formed of the same material as the tank 112, is protected from breakage by two legs 930 that extend downwardly from the bottom 900 of the tank 112.

The transition portion 914 has an outwardly curving section 1002 connected to a substantially straight intermediate section 1003, which is followed by or connected to an inwardly curving section 1004. The transition section 914 for the left hand side tank 112 can thus also be characterized as serpentine or boustrophedonic.

Referring again to FIG. 22, it can be seen that the opening 326 and the top 908 also has an area determined by the product of the depth 918 by the width 920. As shown in FIG. 8 and FIG. 16, the area of the openings in both the center and left-hand side tanks 114 and 112, respectively, are the same which is due to the fact that the transition areas for the middle tank 114 squeeze or reduce the width of that tank while the transition section 914 of the left-hand tank 112 enlarges or increases the width 922 of the left-hand tank 112. Again, this situation is similar concerning the right-side tank. It can also be seen that the depth 926 of the left-hand tank 112 is substantially equal to the depth 426 of the center tank 114. The top portions of both tanks are thus substantially equal in as much as the width of the top 408 of the center tank 114 is substantially equal to the width 920 of the top 908 of the left-hand tank 112.

The left side tank 112 is a mirror image of the right-side tank 116. Stated another way, the left-side tank 112 has a width 1202 near its bottom that is increased or enlarged by a transition section 1212 that is a mirror image of the transition section 1214 for the right-side tank 116. The left-side tank 112 can thus be considered a third tank. It has a top portion with a width substantially equal to the top portion width of the first tank 116. Similarly the left-side tank 112 has a bottom having a width substantially equal to the bottom of the right-side tank 116. The left side tank 112 has opposing side walls and front and back walls all four of which are attached to the bottom and which extend upwardly to the top.

All three tanks 112, 114 and 116 have input inlets or ports described above and identified by reference numeral 322, 324, and 326 the shape and areas of which are substantially identical. In an embodiment, those inlet ports are inclined at an angle relative to horizontal to facilitate refilling the tanks. In a preferred embodiment, the inlet ports 322, 324 and 326 are inclined at the same angle. However, alternate embodiments include inclining those inlet ports at different angles relative to each other.

Configuring the tanks and input ports 322, 324 and 326 to have the shape as shown is contrary to common sense and non-obvious for at least two reasons. First, molding or assembling the tanks to have transition sections adds cost. Second, as can be seen in FIGS. 21 and 23, when the tanks 112, 114 and 116 are removed from the compartment 1108, the left-side tank 112 and the right-side tank 116 are made somewhat unstable by their enlarged openings. The enlarged input ports 322 and 326 for the left-hand tank 112 and the righthand tank 116 extend sideways outside or beyond the foot prints of the bottoms 700 and 901 of the tanks. If the left-hand tank 112 or the right-hand tank 116 is refilled outside the compartment 1108, pouring a liquid into one of the input ports 322 and 326 can create a downward force on transition sections 714 and 914 that creates a torque around the corresponding inside edges 709 and 909 of the bottoms of the tanks, which will tend to tip the tanks over thus rendering them somewhat difficult to use. When the tanks are inside the compartment 1108 however, they are held together as an assembly, which prevents either one of them from tipping over during refilling.

Those of ordinary skill in the art will recognize that the transition sections 414A and 414B on the middle tank 114 opened downwardly, which is to say the portions of the transition sections closest to the top 408 are closer to each other than the portions of the transition sections that are attached to or connected to the side walls 407 and 409. The transition section 714 for the right-side tank 116 and the mirror image transition section 914 for the left-side tank 112 open upwardly, which is to say the top section of the right-side tank 708 is wider than the bottom section. In addition, the top section of the left-side tank 916 is also wider than the bottom section.

Those of ordinary skill in the art will also recognize from FIG. 8 and FIG. 16 that the transition section 714 and its adjacent transition section 414A are complements of each other. The transition section 714 on the right-side tank 116 transitions the left-side side wall 707 outwardly, whereas the right-hand transition section 414A of the middle tank 114 transitions the side wall 409 inwardly. Similarly, the transition section 914 on the left-side tank 112 transitions the right-side wall outwardly, whereas the left-hand transition section 414B of the middle tank 114 transitions the side wall 407 inwardly.

In one embodiment, the covers 328, 330 and 332 are pivotally attached to the top covers. However, in an alternate embodiment the covers 328, 330 and 332 can be pivotally attached to the side walls of the tanks.

In FIG. 8, reference numeral 800 identifies the liquid dispenser identified by reference numeral 100 in the aforementioned co-pending application Ser. No. 13/169,339. A left-hand tank 802, a center tank 804 and a right-hand tank 806 are provided with hollow stringers, 808, 810 and 812 respectively and which are aligned to each other vertically and horizontally (into and out of the plane of the figure) such that air can flow between them. Heat energy in the air that is inside the stringers can be absorbed into sidewalls 814 and 816 when such sidewalls are refrigerated. Conversely, heat energy in heated sidewalls 814 and 816 can be transmitted into the air inside the stringers from which it will flow into the tanks. The stringers 808, 810 and 812 act as heat exchangers with respect to air and liquid in the tanks 802, 804 and 806. In FIG. 8, heat energy is represented by small arrows drawn to show heat being dissipated into air inside the stringers 808, 810 and 812. Heat energy is also depicted as flowing through sidewalls of the tanks into the sidewalls 814 and 816 of the dispenser 800.

Figure 9A:
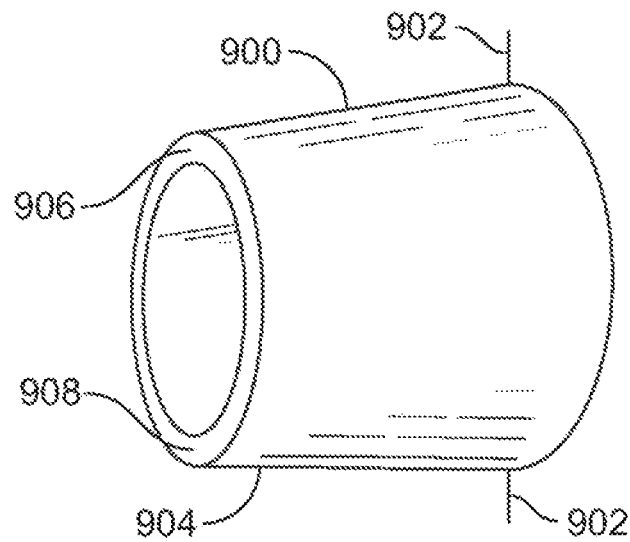
FIG. 9A is an isolated perspective view of a right-hand portion of an alternate embodiment of a stringer.
Figure 9B:
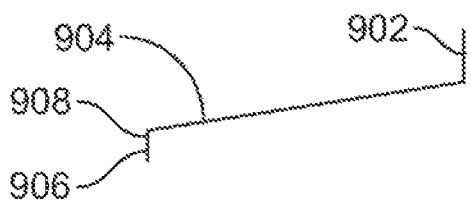
FIG. 9B is a sectional view of a stringer shown in FIG. 9A.
Figure 9B:
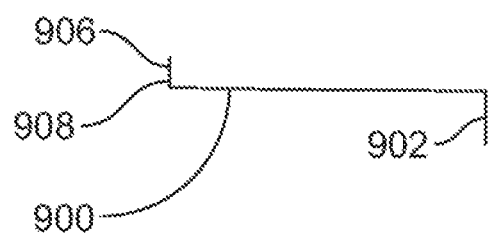

While the preferred embodiment of a tank and stiffener is formed by rotational molding, in an alternate embodiment, a tank can be formed from joined-together molded halves. In such a tank, each of the halves has a stiffener embodied as cone-shaped, inwardly-directed projection, such as the cone-shaped projection 900 depicted in FIG. 9 as extending inwardly from a tank sidewall 902. The projection 900 is tapered 904 with a flange 906 at the distal end 908. The flange 906 provides a surface that can be joined by heat or adhesive to a mating surface on a similar projection from the opposite side of the tank. Alternate and equivalent embodiments include non-cone shaped inwardly-directed projecting portions. Alternate and equivalent embodiments also include inwardly-directed projections that are of unequal lengths.

Figure 10:
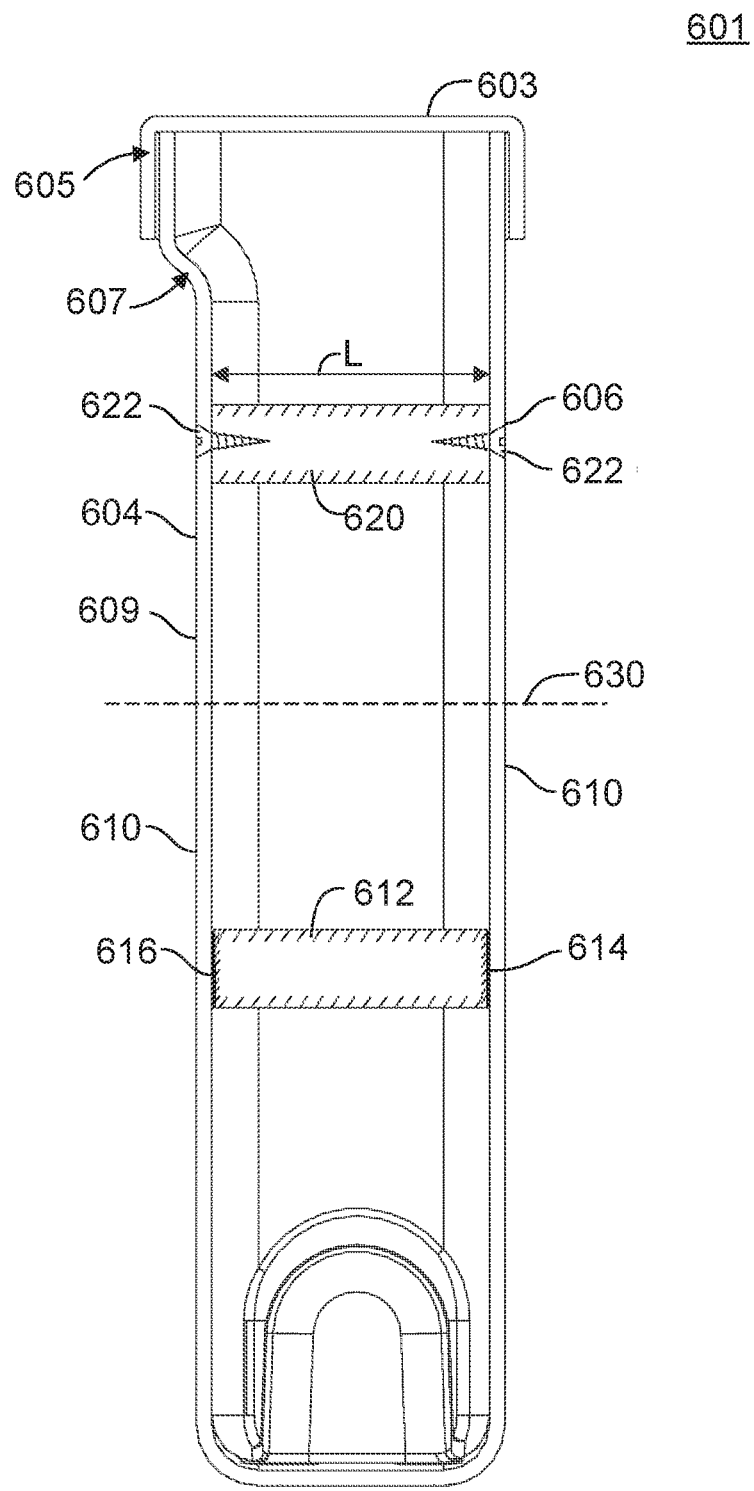
FIG. 10 is a sectional view of the right-hand tank shown in FIG. 6 with an alternate embodiment of a stringer.

FIG. 10 depicts a cross sectional view of yet another embodiment of a thin-walled rectangular liquid holding tank 601. The particular tank 601 shown in FIG. 10 is shaped to be used on the right-hand side of the tank assembly shown in FIG. 1. A top portion 605 of the left-hand side 609 of the tank 601 has an elbow or curve 607 that conforms to the shape of the right-hand side of the center tank 104.

Unlike the tanks described above, the tank 601 shown in FIG. 10 is molded without a stiffener or stringer. Stated another way, the stringers in the tank shown in FIG. 10 are not formed as part of the tank side walls during a molding process. Solid or semi-solid, cylindrical wall stiffeners 620 and 612 are instead added to the interior of the tank 601 after the tank 601 is molded. The after-molding stringers are preferably added to the tank by being placed therein through the top 603 of the tank, which can be removed. One or more sidewall stiffeners are then placed inside the tank and attached to the sidewalls.

In FIG. 10, a top stiffener 620 has a length L that fits just inside the side walls 604 and 606. The top stiffener 620 is attached to the sidewalls 604 and 606 using a common mechanical fastener such as a screw 622.

A bottom stiffener 622 having the same length as the top stiffener 620 is attached to the side walls 604 and 606 by either by a localized heating of the stiffener 622 and sidewall, an ultrasonic weld 614 between the stiffener and sidewall or an adhesive 616 or both welding and an adhesive or heat and an adhesive.

Whether the tanks are formed by rotational molding or by assembling the tanks in halves or by other methods, the wall stiffeners described above are considered herein to be tubes. A tube need not have a circular cross section. A tube that forms a wall stiffener can have non-circular cross-sectional shapes, the tube cross-sectional shape being the cross-sectional shape orthogonal to the center line or axis 314, as shown in FIG. 3.

The wall stiffeners referred to above as a stringer, provides an internally-located reinforcement to sidewalls of a holding tank for liquids. The stringers in the embodiments depicted in FIGS. 1-9 are considered to be connected or attached to the sidewalls, even though the stringers formed by rotational molding are integrally formed as part of the sidewalls during a molding process.

The stringers are considered herein as "extending" between the walls. They maintains a tank width by opposing outward-directed force caused by liquid inside the tank and inward deflection that can be caused by manufacturing differences or outward forces applied to the tank sidewalls. When the assembly of tanks is disposed inside of a cabinet, such as a refrigerated dispensing cabinet described in the co-pending patent application identified above, or as shown in FIG. 8, the reinforced sidewalls of the liquid holding tanks allow the tanks to be individually refilled or emptied without having them deform in response to liquid inside one or more of them. The reinforcement also helps keep the sidewalls rigid and as shown in the figures, upright, so that measurement of the volume inside the tanks determined by the level of the liquid can be made more accurately.

The foregoing description is for purposes of illustration only. The true scope of the invention is set forth in the following claims.

The invention claimed is:

1. A liquid holding tank comprising:
 a bottom;
 a first side wall connected to the bottom;
 a second side wall connected to the bottom and opposite the first side wall, a first tank width defined between the first side wall and the second side wall;
 a tank top defined between a first top edge and a second top edge, the first top edge generally in vertical alignment with the first side wall, and the second top edge located away from the second side wall in a direction away from the first side wall; and
 a first rigid stringer extending between the first and second side walls, the first rigid stringer maintains the first and second side walls substantially vertical and substantially parallel.

2. The liquid holding tank of claim 1, wherein the first rigid stringer is comprised of first and second tapered regions and first and second ends, the first and second tapered regions converging to a center of the liquid holding tank, the first and second tapered regions each having an annular cross section, and the first end of the first rigid stringer is connected to the first side wall and the second end of the first stringer is connected to the second side wall.

3. The liquid holding tank of claim 1 further comprising a cover that extends over the tank top and at least partially encloses the first top edge and the second top edge.

4. The liquid holding tank of claim 3, further comprising a door rotatably attached to the cover, the door selectively operable to occlude or expose an opening into an interior of the liquid holding tank.

5. The liquid holding tank of claim 1 further comprising:
a rear wall connected to the bottom, the first side wall, and the second side wall; and
a detent formed in the bottom and the rear wall, the detent extending from the bottom and the rear wall into an open interior of the liquid holding tank.

6. The liquid holding tank of claim 5, wherein the detent further comprises a rounded top end.

7. The liquid holding tank of claim 1 further comprising a drain extending downwardly from the bottom, the drain configured to dispense liquid from the liquid holding tank.

8. The liquid holding tank of claim 7, further comprising at least one leg extending downwardly from the bottom at a location about the first drain.

9. The liquid holding tank of claim 1, further comprising a second rigid stringer extending between the first and second side walls, wherein the second rigid stringer maintains the first and second side walls substantially vertical and substantially parallel.

10. The liquid holding tank of claim 9, wherein the first side wall and the second side wall each have a geometric center and wherein the first and second rigid stringers extend between the first and second walls at first and second stringer locations, the first and second stringer locations being equally spaced apart from the geometric centers of the first and second side walls.

11. A liquid dispenser comprising:
a cabinet having an interior compartment, the interior compartment having an interior width;
a first tank disposed within the interior compartment and having a first volume, the first tank comprising a bottom a first side wall connected to the bottom, a second side wall connected to the bottom and opposite the first side wall, a first tank width defined between the first side wall and the second side wall, the first tank comprising a tank top defined between a first top edge and a second top edge, the first top edge generally in vertical alignment with the first side wall, and the second top edge located away from the second side wall in a direction away from the first side wall, and the first tank comprising a first rigid stringer extending between the first and second side walls, the first rigid stringer maintains the first and second side walls substantially vertical and substantially parallel; and
a second tank disposed within the interior compartment and having a second volume, the second tank comprising a bottom a third side wall connected to the bottom, a fourth side wall connected to the bottom and opposite the third side wall, a second tank width defined between the third side wall and the fourth side wall, the second tank comprising a tank top defined between a third top edge and a fourth top edge, and the second tank comprising a second rigid stringer extending between the third and fourth side walls, the second rigid stringer maintains the third and fourth side walls substantially vertical and substantially parallel.

12. The dispenser of claim 11, wherein the first tank comprises a rear wall connected to the bottom of the first tank and the second tank comprises a rear wall connected to the bottom of the second tank, and further comprising:
a first detent formed in the bottom and the rear wall of the first tank, the first detent extending from the bottom and the rear wall into an open interior of the first tank; and
a second detent formed in the bottom and the rear wall of the second tank, the second detent extending from the bottom and the rear wall into an open interior of the second tank.

13. The dispenser of claim 11, further comprising:
a first drain extending downwardly from the bottom of the first tank, the first drain configured to dispense liquid from the first tank while the first tank is located in the cabinet;
at least one first leg extending downwardly from the bottom of the first tank at a location about the first drain;
a second drain extending downwardly from the bottom of the second tank, the second drain configured to dispense liquid from the second tank while the second tank is located in the cabinet; and
at least one second leg extending downwardly from the bottom of the second tank at a location about the second drain.

14. The dispenser of claim 13, further comprising:
a first pinch valve connected to the cabinet, the first pinch valve operable to receive a first flexible tube extending from the first drain,
a second pinch valve connected to the cabinet, the second pinch valve operable to receive a second flexible tube extending from the second drain; and
a controller connected to the first pinch valve and the second pinch valve, wherein the controller operates the first pinch valve and the second pinch valve to selectively occlude or release the first flexible tube and the second flexible tube to dispense a volume of liquid therethrough.

15. The liquid dispenser of claim 14, further comprising:
a first load cell connected to the cabinet and at least partially extending into the interior compartment and engaging the first tank to measure at least a partial weight of the first tank and liquid in the first tank;
a second load cell connected to the cabinet and at least partially extending into the interior compartment and engaging the second tank to measure at least a partial weight of the second tank and liquid in the second tank;
wherein the controller operates the first pinch valve and the second pinch valve based in part upon the at least partial weights measured respectively by the first load cell and the second load cell.

16. The liquid dispenser of claim 11, wherein a first tank top width between the first top edge and the second top edge is substantially equal to a second tank top width between the third top edge and the fourth top edge.

17. The liquid dispenser of claim 16, wherein the second tank width is greater than the first tank width, the first tank top width is greater than the first tank width, and the second tank top width is less than the second tank width.

18. The liquid dispenser of claim 17, wherein the third top edge is located away from the third side wall in a direction towards the fourth side wall, and the second side wall and the second top edge correspond to the third side wall and the third top edge.

19. The dispenser of claim 18, wherein the first side wall, second side wall, third side wall and fourth side wall are each thin, substantially planar, substantially vertical, and have smooth outside surfaces.

20. The dispenser of claim 11, wherein the first rigid stringer is hollow and open between a plane of the first wall and a plane of the second wall, the second rigid stringer is hollow and open between a plane of the third wall and a plane of the fourth wall, the first rigid stringer is aligned with the second rigid stringer and the first and second rigid stringers are configured to exchange heat between air inside the first and second rigid stringers and at least one of liquid and air inside the first and second tank.

* * * * *